(12) United States Patent
Hiroi et al.

(10) Patent No.: US 7,819,037 B2
(45) Date of Patent: Oct. 26, 2010

(54) SHIFT CONTROL DEVICE AND STRADDLE TYPE VEHICLE

(75) Inventors: Kazutaka Hiroi, Shizuoka-ken (JP); Shigeo Morisugi, Shizuoka-ken (JP); Masao Sugita, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 495 days.

(21) Appl. No.: 11/867,289

(22) Filed: Oct. 4, 2007

(65) Prior Publication Data

US 2008/0099266 A1 May 1, 2008

(30) Foreign Application Priority Data

Oct. 27, 2006 (JP) ............................. 2006-292896

(51) Int. Cl.
*B60W 10/00* (2006.01)
*B60W 10/04* (2006.01)
*B60W 10/10* (2006.01)
*B60W 10/02* (2006.01)
*F16H 59/00* (2006.01)
*F16H 61/00* (2006.01)
*F16H 63/00* (2006.01)

(52) U.S. Cl. .................. 74/335; 74/336 R; 477/115; 477/70; 477/83; 477/175; 477/180

(58) Field of Classification Search .................. 74/335, 74/336 R; 477/70, 79, 80, 83, 115, 180, 477/175

See application file for complete search history.

(56) References Cited

U.S. PATENT DOCUMENTS

| 6,073,507 | A | * | 6/2000 | Ota et al. | ..................... 74/335 |
| 6,085,607 | A | | 7/2000 | Narita et al. | |
| 6,117,046 | A | * | 9/2000 | Ota et al. | ..................... 477/79 |
| 6,341,680 | B1 | * | 1/2002 | Ota et al. | ................... 192/3.55 |

FOREIGN PATENT DOCUMENTS

JP          11-82709 A          3/1996

* cited by examiner

*Primary Examiner*—Tisha D Lewis
(74) *Attorney, Agent, or Firm*—Keating & Bennett, LLP

(57) ABSTRACT

A shift control device is provided for reducing a shock generated at a clutch engagement moment in a gearshift operation in a straddle type vehicle having a shift control device that makes the clutch operation and the gearshift operation using the power of an actuator. The actuator is controlled based upon a rotational position and a speed of a shift shaft. When the rotational position of the shift shaft is located between a first position and a second position, the shift shaft is rotated at a speed slower than a rotational speed at which the shift shaft is rotated before reaching the first position to engage a gearshift clutch at a low speed. The first position and the second position are set in such a manner that the gearshift clutch is in a halfway engaged state when the shift shaft is located at a rotational position between the first position and the second position.

15 Claims, 18 Drawing Sheets

| Shift stage toward which gearshift operation is made | | First speed |
|---|---|---|
| Shift up | First shift stage to second shift stage | $\Delta\theta_{12}$ |
| | Second shift stage to third shift stage | $\Delta\theta_{23}$ |
| | Third shift stage to fourth shift stage | $\Delta\theta_{34}$ |
| Shift down | Second shift stage to first shift stage | $\Delta\theta_{21}$ |
| | Third shift stage to second shift stage | $\Delta\theta_{32}$ |
| | Fourth shift stage to third shift stage | $\Delta\theta_{43}$ |

$$\begin{pmatrix} \Delta\theta_{12} < \Delta\theta_{23} < \Delta\theta_{34} \\ \Delta\theta_{21} < \Delta\theta_{32} < \Delta\theta_{43} \end{pmatrix}$$

*Figure 15*

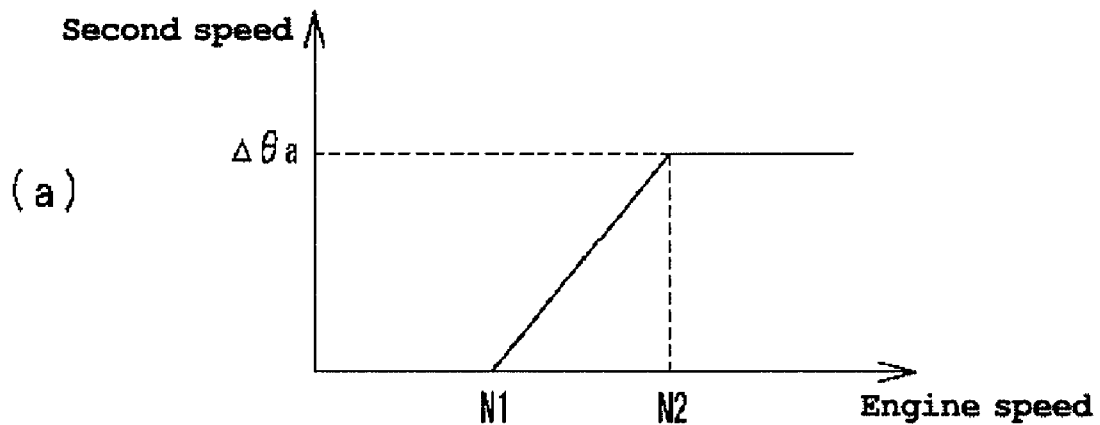
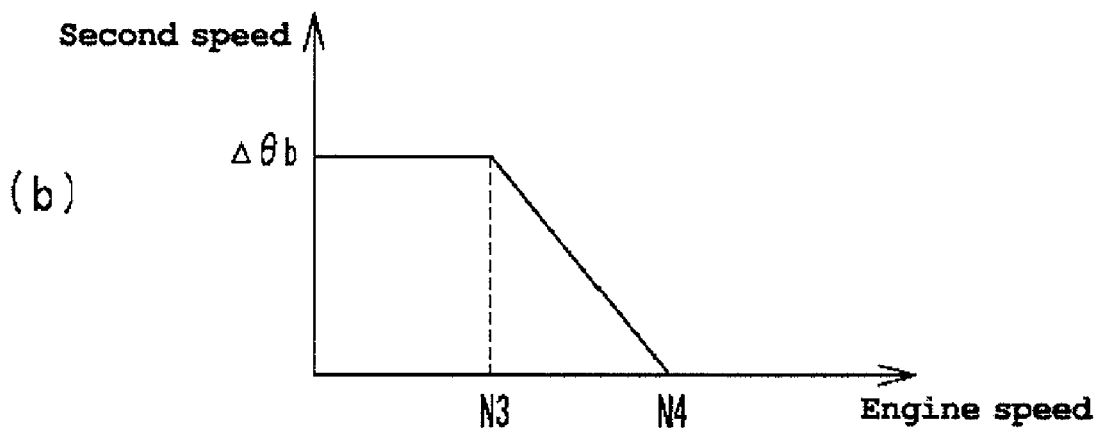
*Figure 16*

SHIFT CONTROL DEVICE AND STRADDLE TYPE VEHICLE

CROSS-REFERENCE TO RELATED APPLICATIONS

This application claims the benefit of Japanese Patent Application No. JP 2006-292896, filed on Oct. 27, 2006, in the Japanese Patent Office, the disclosure of which is incorporated herein by reference in its entirety.

BACKGROUND OF THE INVENTION

1. Field of the Invention

The present invention generally relates to a shift control device that controls engagement of a clutch and controls a shift movement of a shift component using the power of a drive power source such as, for example, a motor. More particularly, the present invention relates to a straddle type vehicle comprising such a shift control device.

2. Description of the Related Art

In a shift control device, power from an electric motor rotates a shift shaft, and, with the rotation of the shift shaft, a clutch is disengaged and engaged and also shift gears are shifted (for example, see JP-A-Hei 11-82709 and U.S. Pat. No. 6,085,607B).

JP-A-Hei 11-82709 and U.S. Pat. No. 6,085,607B both propose that a shift shaft is rotated at a high speed before reaching a predetermined time and then the shift shaft is rotated at a low speed after the predetermined time to reduce a shift shock generated when the clutch is engaged.

Specifically, the shift control devices described in JP-A-Hei 11-82709 and U.S. Pat. No. 6,085,607B execute a pulse width modulation (PWM) control that changes a target angular position of the shift shaft at preset intervals and varies a duty ratio in accordance with the target angular position when the clutch that is once disengaged following a gearshift operation is engaged once again. By executing such a control, the shift shaft, as shown in FIG. 18 (noted as "shift spindle" in FIG. 18), rotates at a high speed in an angular range given during a period from a time t4 to a time t5 and existing in the proximity of an angular range in which the clutch is engaged and then rotates at a low speed in the angular range given after the time t5 and in which the clutch is engaged.

SUMMARY OF THE INVENTION

However, in the devices that realize both of the disengagement/engagement of the clutch and the shift movement of the shifter using one actuator, a rotational amount of the shift shaft in a period after the shift movement is completed and before the clutch engagement is started (see "L0" of FIG. 18) is larger than a rotational amount used in a device which realizes both of the operations using separate actuators. Therefore, the control based upon a time and a speed disclosed in JP-A-Hei 11-82709 and U.S. Pat. No. 6,085,607B (i.e., the control changes the rotational speed of the shift shaft in accordance with a specific time) is not always able to reduce a shift shock generated when the clutch is engaged.

Also, in the control based upon a time and a speed disclosed in JP-A-Hei 11-82709 and U.S. Pat. No. 6,085,607B, a rotational position of the shift shaft, actually, ought to vary along the chain double-dashed line of FIG. 18. Thus, it cannot be assumed that the rotational speed of the shift shaft is always a low speed in the angular range where the clutch is engaged.

Further, in the shift control device executing the disengagement/engagement of the clutch and the shift movement of the shifter using the same actuator, an individual difference is likely to appear in the rotational position of the shift shaft when the clutch is halfway engaged because of dimensional errors from device to device, errors in assembling work or the like. If such an individual differences once appears, a certain shift control device can have a situation such that the clutch is halfway engaged during a high speed rotation of the shift shaft from the disengaged state of the clutch to the preset clutch position. The shock generated at the clutch engagement moment can be large.

BRIEF DESCRIPTION OF THE DRAWINGS

These and other features, aspects and advantages of the present invention will be described with reference to the drawings of certain preferred embodiments that are intended to illustrate and not to limit the invention.

FIG. 15 is a table showing one example of a first table.

FIG. 16(a) and FIG. 16(b) are graphs showing one example of a second table.

DETAILED DESCRIPTION OF THE PREFERRED EMBODIMENTS

Figure 1:
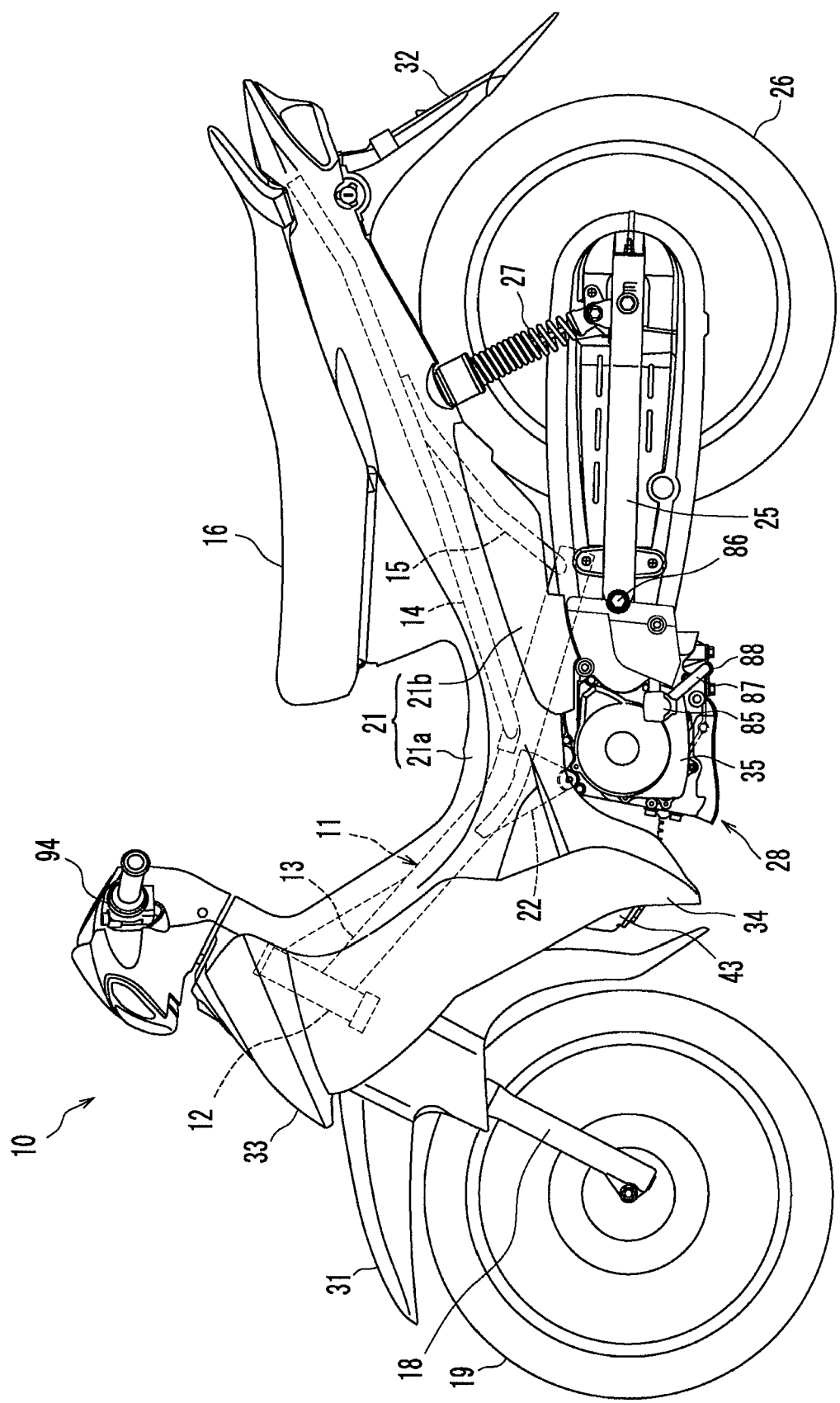
FIG. 1 is a left side elevational view of a motorcycle that is arranged an d configured in accordance with certain features, aspects and advantages of an embodiment of the present invention.

With reference now to FIG. 1, the illustrated straddle type vehicle comprises a motorcycle 10. The illustrated motorcycle 10 comprises a so-called moped type of motorcycle. However, the term "moped type" and the term "motorcycle" as used herein should not be inferred to restricts the maximum speed, the displacement amount or the like of the vehicle. Neither term infers a size restriction or the like of the vehicle either. Moreover, the straddle type vehicle according to the present invention is not limited to a moped type of a motor-cycles (e.g., a scooter), and certain features, aspects and advantages of embodiments of the present invention can be used with other types of motorcycles such as, for example, vehicles having a fuel tank placed in front of a seat and other straddle type vehicles such as, for example, all-terrain vehicles (ATVs) and the like.

The illustrated motorcycle 10 comprises a vehicle frame 11 that forms a framework. A seat 16 can be positioned on the vehicle frame 11. In the following descriptions, the fore to aft and lateral directions mean directions perceived by the rider sitting on the seat 16.

The vehicle frame 11 comprises a steering head pipe 12, a single main frame 13 extending obliquely downward and rearward from the steering head pipe 12, a pair of right and left seat rails 14 extending obliquely upward and rearward from a mid portion of the main frame 13, and a pair of right and left back stays 15 extending obliquely upward and rearward from the main frame 13 in the rear of the seat rails 14. The back stays 15 are connected to a rear end portion of the main frame 13 and mid portions of the respective seat rails 14. The steering head pipe 12 supports a front wheel 19 via a front fork 18.

A top surface and right and left surfaces of the vehicle frame 11 preferably are generally covered with a top cover 21a and respective side covers 21b. The top cover 21a and the side covers 21b are hereinafter called a vehicle cover 21.

A right first engine bracket 22 and a left first engine bracket 22 protrude downward from the mid portion of the main frame 13. Although not shown, a right second engine bracket, a left second engine bracket, a right rear arm bracket and a left rear arm bracket extend from the rear end portion of the main frame 13. In the following descriptions, the brackets attached to the main frame 13 and so forth comprise portions of the vehicle frame 11.

The rear arm brackets preferably protrude downward from the rear portion of the main frame 13. The rear arm brackets can comprise a pivot shaft 86. The pivot shaft 86 pivotally carries a forward portion of a rear arm 25. A rear end portion of the rear arm 25 supports a rear wheel 26. The vehicle frame 11 suspends a rear portion of the rear arm 25 via cushion units 27 or the like.

The motorcycle 10 comprises a front fender 31 covering a top surface and a rear surface of the front wheel 19 and a rear fender 32 covering a surface of the rear wheel 28 facing obliquely upward and rearward. Also, the motorcycle 10 comprises a front cowling 33 and right and left leg shields 34 in addition to the vehicle cover 21 described above.

The vehicle frame 11 supports an engine unit 28 that drives the rear wheel 26. The engine unit 28 comprises a crankcase 35 and a cylinder 43 that extends forward or obliquely upward and forward from the crankcase 35. Footrests 85 are disposed on the right and left sides of the engine unit 28. The crankcase 35 supports the right and left footrests 85 via a coupling bar 87 and an attaching plate 88 that is fixed to the coupling bar 87.

Next, with reference primarily to FIG. 2 and FIG. 3, a structure of the engine unit 28 will be described. The engine unit 28 comprises an engine 29. The engine 29 comprises a crankshaft 30, a centrifugal clutch 36, a gearshift clutch 37 that is disengaged and engaged when a gearshift operation is made, and a gear shifter 38. Although the engine 29 can have any suitable configuration, the illustrated engine 29 comprises a four-stroke, single cylinder engine. The engine 29 is not limited to an internal combustion engine such as, for example, the gasoline engine used in this embodiment and can be an electric motor or the like. Further, in some configurations, the engine can be a combination of the gasoline engine and the electric motor.

Figure 3:
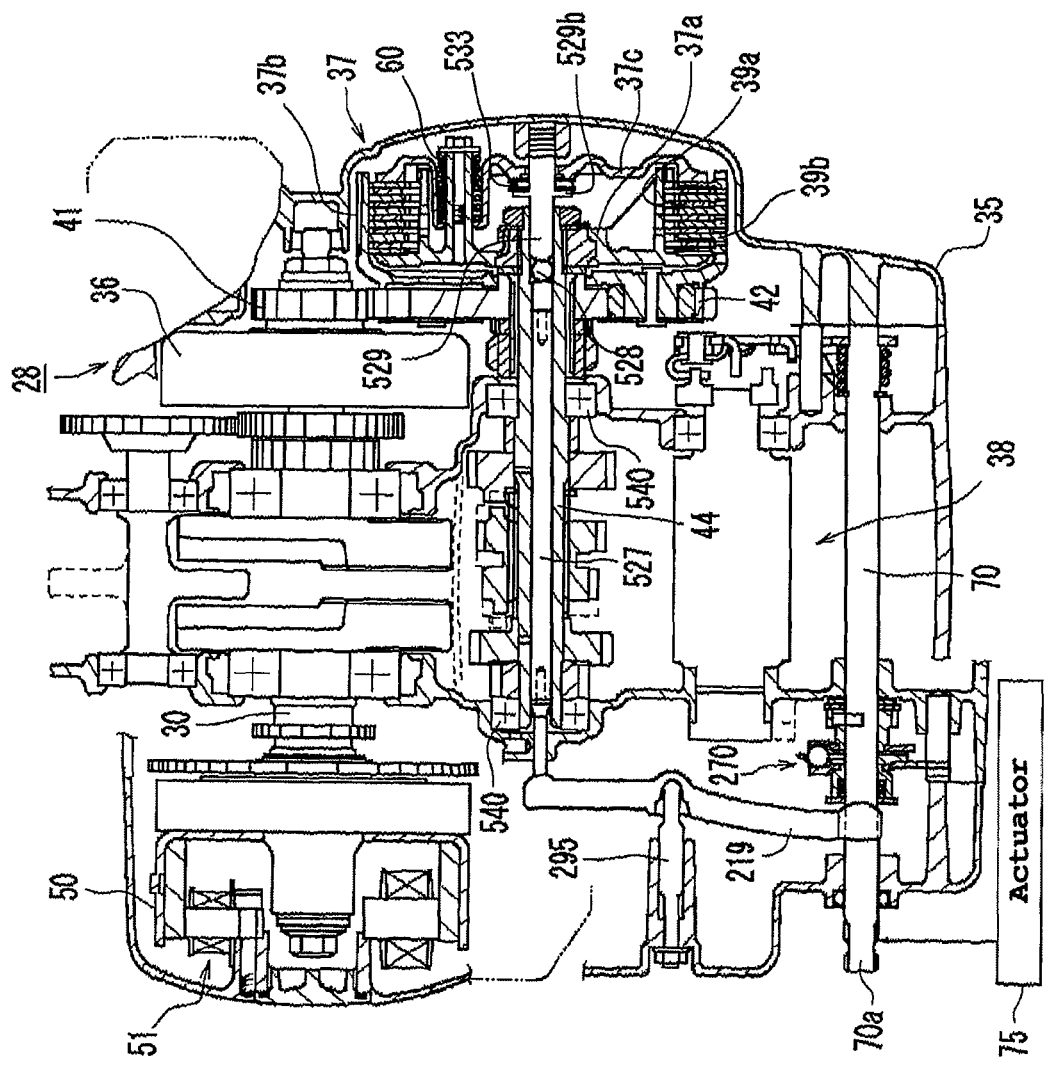
FIG. 3 is a cross section view of the engine unit of FIG. 2.

As shown in FIG. 3, the centrifugal clutch 36 can be mounted to a right end portion of the crankshaft 30. Although not shown, the centrifugal clutch 36 comprises a clutch boss fixed to the crankshaft 30 and a clutch housing. The centrifugal clutch 36 is disengaged while the engine is idling and is engaged when the motorcycle is moving. That is, the centrifugal clutch 36 is disengaged if a rotational speed of the crankshaft 30 (i.e., the engine speed) is less than a predetermined speed and is engaged if the rotational speed exceeds the predetermined speed.

The gearshift clutch 37 preferably comprises a wet type, multiple plate clutch and comprises a clutch boss 37a and a clutch housing 37b. However, the gearshift clutch 37 is not limited to any particular type. The centrifugal clutch 36 comprises a gear 41 and the clutch housing 37b of the gearshift clutch 37 also comprises a gear 42. These gears 41, 42 mesh with each other. Accordingly, the clutch housing 37b of the gearshift clutch 37 rotates with the centrifugal clutch 36, or more specifically the illustrated clutch housing of the gearshift clutch 37 rotates with the clutch housing of the centrifugal clutch 36.

The illustrated clutch boss 37a is mounted to a main shaft 44 and rotates with the main shaft 44. The clutch housing 37b is mounted to the main shaft 44 for rotation about the main shaft 44. The clutch boss 37a comprises a plurality of friction plates 39a while the clutch housing 37b comprises a corresponding plurality of clutch plates 39b. Each friction plate 39a is interposed between respective clutch plates 39b, 39b that neighbor each other.

A pressure plate 37c is disposed on the right side of the illustrated clutch boss 37a. The pressure plate 37c is axially moveable and is urged leftward in FIG. 3 by a compression spring 60. That is, the pressure plate 37c is urged in a direction in which the pressure plate 37c compresses the friction plates 39a and the clutch plates 39b together. When the pressure plate 37c moves rightward against the urging force of the compression spring 60, the friction plates 37c and the clutch plates 39b separate from each other. The gearshift clutch 37 is thus disengaged.

Figure 2:
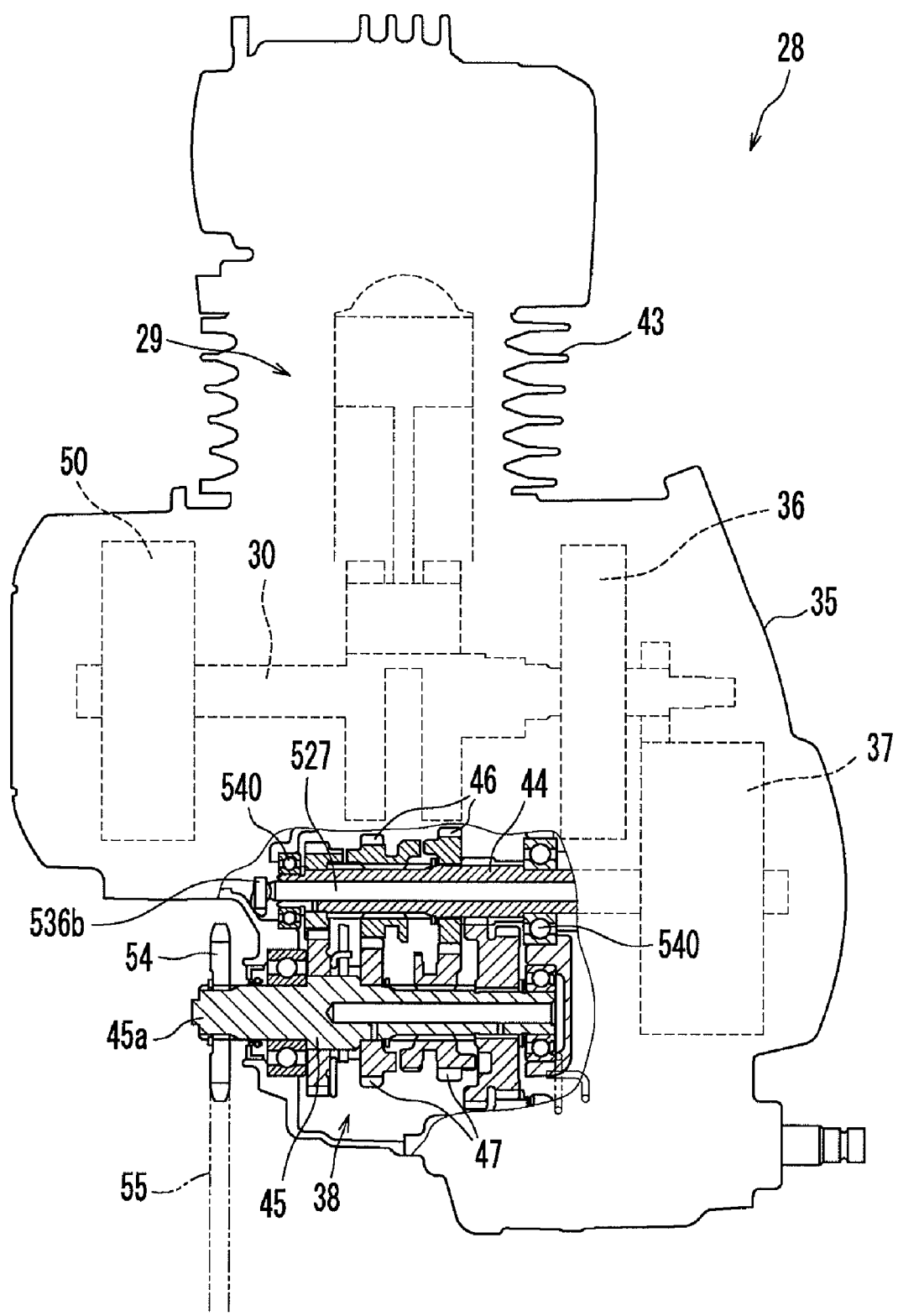
FIG. 2 is a partially broken cross section view of an engine unit used in the motorcycle of FIG. 1.

As shown in FIG. 2, a plurality of shiftable gears 46 are arranged circumferentially around the main shaft 44. A plurality of corresponding shiftable gears 47 are mounted to a drive shaft 45 that extends generally parallel to the main shaft 44. The shiftable gears 46 on the main shaft 44 and the shiftable gears 47 on the drive shaft 45 mesh with each other. Either the shiftable gears 46 or the shiftable gears 47, or both of them are mounted to idle relative to the main shaft 44 or the drive shaft 45, except the gears that are selected. Accordingly, driving force is transmitted from the main shaft 44 to the drive shaft 45 through any selected pair of the shiftable gears.

Figure 4:
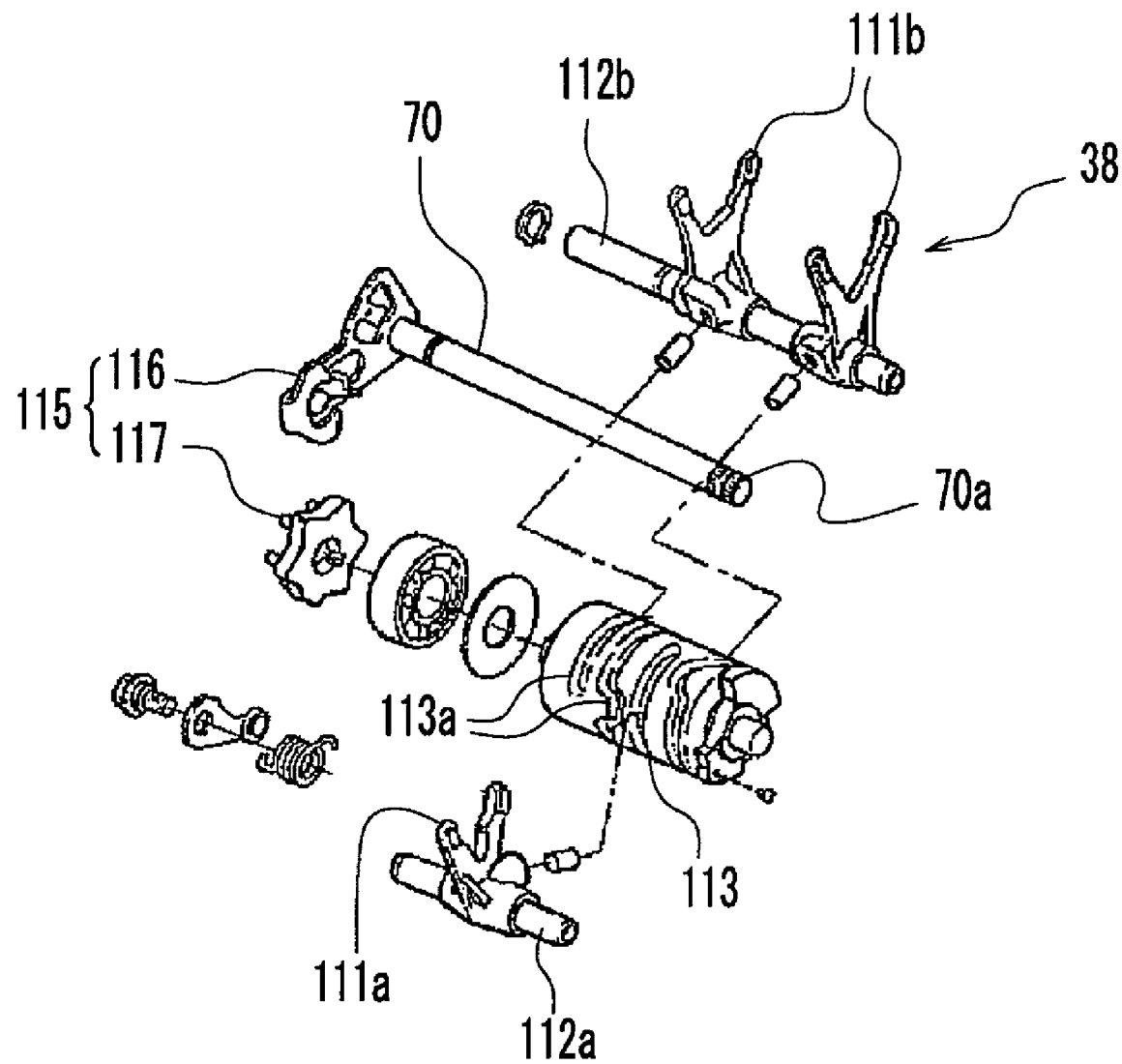
FIG. 4 is an exploded perspective view of a portion of a gear shifter used in the engine unit of FIG. 2.

The shiftable gears are selected via a shift cam 113 (see FIG. 4). As shown in FIG. 4, the gear shifter 38 includes a shift fork 111a that slides the shiftable gears 46 in the axial direction of the main shaft 44 and a slide rod 112a that supports the shift fork 111a for sliding movement. Also, the gear shifter 38 includes a shift fork 111b that slides the shiftable gears 47 in the axial direction of the drive shaft 45 and a slide rod 112b that supports the shift fork 111b for slide movement. Cam grooves 113a are circumferentially formed around the shift cam 113. The shift forks 111a, 111b slide along the cam grooves 113a.

The shift cam 113 rotates with the rotation of the shift shaft 70 through a ratchet mechanism 115. The ratchet mechanism 115 is a mechanism that rotates the shift cam 113 at fixed intervals (angles) to regularly move the shift forks 111a, 111b. The ratchet mechanism 115 thus has ratchet functions effective in both forward and reverse directions to shift stages one at a time for changing gear ratios. A shift arm 116 of the ratchet mechanism 115 transmits the rotation of the shift shaft 70 and simultaneously restricts a stroke of the shift shaft 70 to prevent an overrun of the shift cam 113. The stopper plate 117 of the ratchet mechanism 115 fixes the shift cam 113 to a predetermined position.

As shown in FIG. 3, a bearing 540 supports the main shaft 44, which preferably is hollow, for rotation. A first push rod 527, a ball 528 and a second push rod 529 are movably inserted into the hollow of the main shaft 44, and their axial movement shifts the pressure plate 37c in a lateral direction. The second push rod 529 has a flange 529b. A bearing 533 is interposed between the flange 529b and the pressure plate 37c. Thus, the pressure plate 37c is rotatable, although the second push rod 529 is not rotatable.

Figure 5:
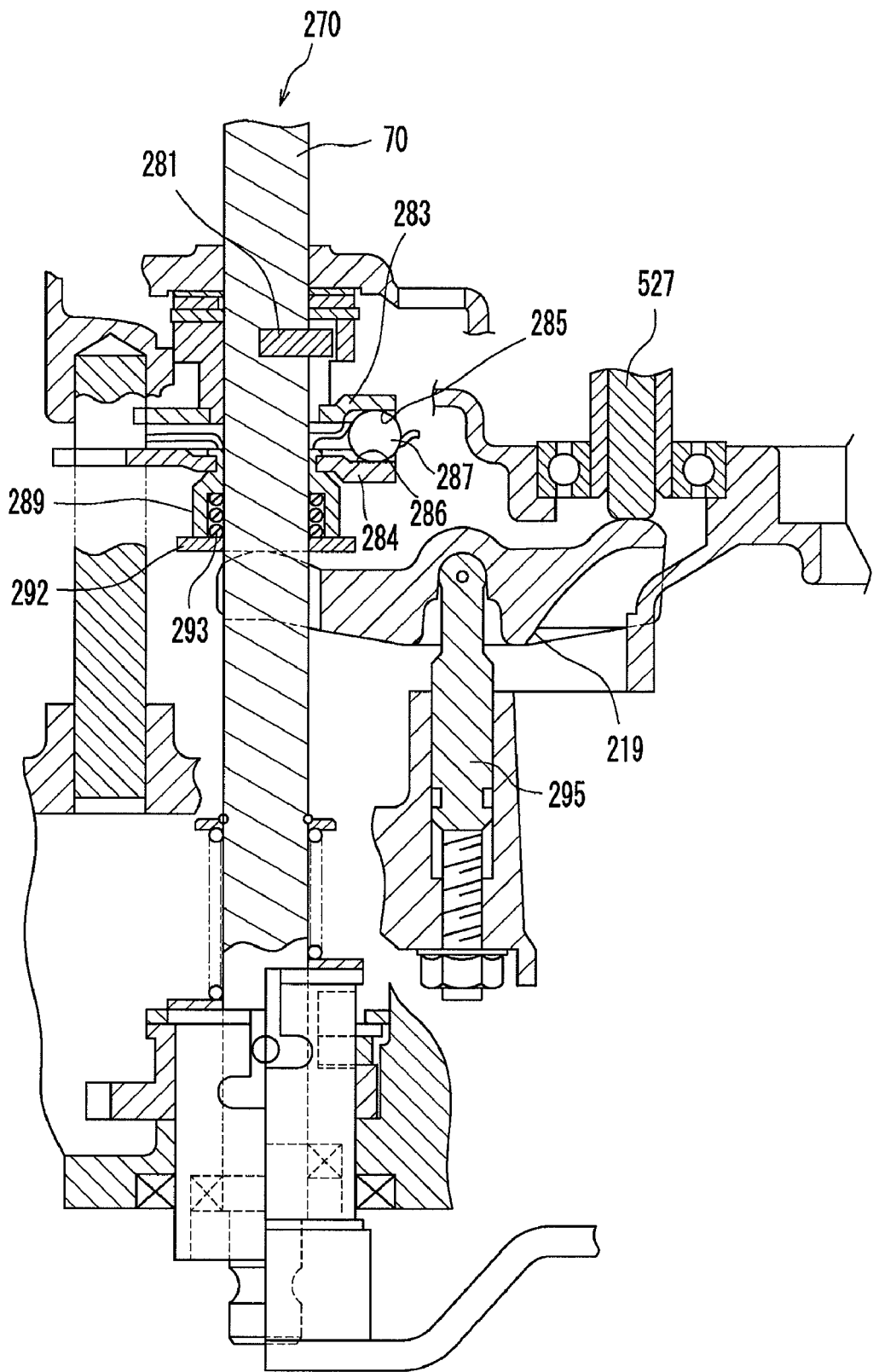
FIG. 5 is an enlarged cross section view showing a clutch operating power transmitting mechanism.

A clutch operating power transmitting mechanism 270 converts the rotation of the shift shaft 70 to a reciprocal movement of the first push rod 52. FIG. 5 is an enlarged cross sectional view of the clutch operating power transmitting mechanism 270 shown in FIG. 3. The clutch operating power transmitting mechanism 270 shown in FIG. 5 is a ball type cam mechanism which converts the rotation of the shift shaft 70 into the desired reciprocal movement.

The clutch operating power transmitting mechanism 270 comprises a first cam plate 283 that rotates together with the shift shaft 70 and a second cam plate 284 that opposes the first cam plate 283. The first cam plate 283 is fixed to the shift shaft 70 with a coupling pin 281. Respective opposing surfaces of the first cam plate 283 and the second cam plate 284 comprise a first cam groove 285 and a second cam groove 286.

The illustrated clutch operating power transmitting mechanism 270 comprises three balls 287 (FIG. 5 shows only one of them) that are interposed between the first cam plate 283 and the second cam plate 284. Those balls 287 engagingly fit in the first cam groove 285 and the second cam groove 286. Each of the first and second cam plates 283, 284 has a disk-like shape.

The second cam plate 284 is fixed to a boss 289, which is movable in the axial direction of the shift shaft 70. A press plate 292 contacts with a bottom end of the boss 289. The press plate 292 touches a pressure lever 219 described later. A compression coil spring 293 is interposed between the press plate 292 and the boss 289.

A left end portion of the pressure lever 219 touches the pressure plate 292. A right end portion of the pressure lever 219 touches the first push rod 527 (see FIG. 3 as well). A support shaft 295 supports a central portion of the pressure lever 219 in its longitudinal direction. The pressure lever 219 is pivotable about a contact point of the support shaft 295 which functions as a fulcrum.

When the shift shaft 70 rotates with the rotation of the actuator 75 (see FIG. 3), the first cam plate 283 also rotates together with the rotation of the shift shaft 70. Because the second cam plate 284 does not rotate together with the shift shaft 70, the first cam plate 283 rotates relative to the second cam plate 284. As a result of the relative motion between the plates 283, 284, the ball 287 moves circumferentially in the cam groove 286 of the second cam plate 284 while being held in the cam groove 285 of the first cam plate 286. When the shift shaft 70 further rotates, the ball 287 surmounts the cam groove 286 and comes out from the cam groove 286. Because the ball 287 comes out from the cam groove 286, the second cam plate 284 is moved away from the first cam plate 283 by the ball 287 in the axial direction of the shift shaft 70. Because of the movement of the second cam plate 284, the press plate 292 presses the left end portion of the pressure lever 219 (downward in FIG. 5).

When the press plate 292 presses the left end portion of the pressure lever 219, the pressure lever 219 pivots about the contact point of the support shaft 295, which functions as the fulcrum. Thus, the right end portion of the pressure lever 219 presses the first push rod 527 (upward in FIG. 5). Because the pressure lever 219 presses the first push rod 527, the first push rod 527, as shown in FIG. 3, slides rightward. The first push rod 52 thus presses the second push rod 529 with the ball 528. Thus, the second push rod 529 slides rightward in FIG. 3.

As shown in FIG. 3, the axial movement of the second push rod 529 moves the pressure plates 37c rightward against the urging force of the compression spring 60. As a result, the compressive contact state of the friction plates 39a and the clutch plates 39b is released and the gearshift clutch 37 is disengaged.

As discussed above, the shift shaft 70 and the pressure plate 37c are coupled together by the pressure lever 219, the first push rod 527, the ball 528 and the second push rod 529. The pressure plate 37c thus moves in accordance with the rotation of the shift shaft 70. That is, upon the start of the rotation of the shift shaft 70, the pressure plate 37c moves rightward. When a rotational angle of the shift shaft 70 reaches a preset angle (clutch disengagement start angle), the gearshift clutch 37 is disengaged. When the shift shaft 70 further rotates and its angle reaches another preset angle (shift start angle), the shift cam 113 rotates (see FIG. 4) to cause a gearshift operation.

As shown in FIG. 3, a flywheel magneto 50 is mounted to a left end portion of the crankshaft 30. The flywheel magneto 50 forms a rotor of a generator 51.

A portion of the illustrated shift shaft 70 protrudes outside the crankcase 35 and forms a protruding section 70a. As shown in FIG. 2, a portion of the drive shaft 45 also protrudes outside the crankcase 35. A sprocket 54 is fixed to a protruding section 45a of the drive shaft 45. A chain 55 is wound around the drive shaft sprocket 54 and a sprocket (not shown) of the rear wheel 26.

Figure 6:
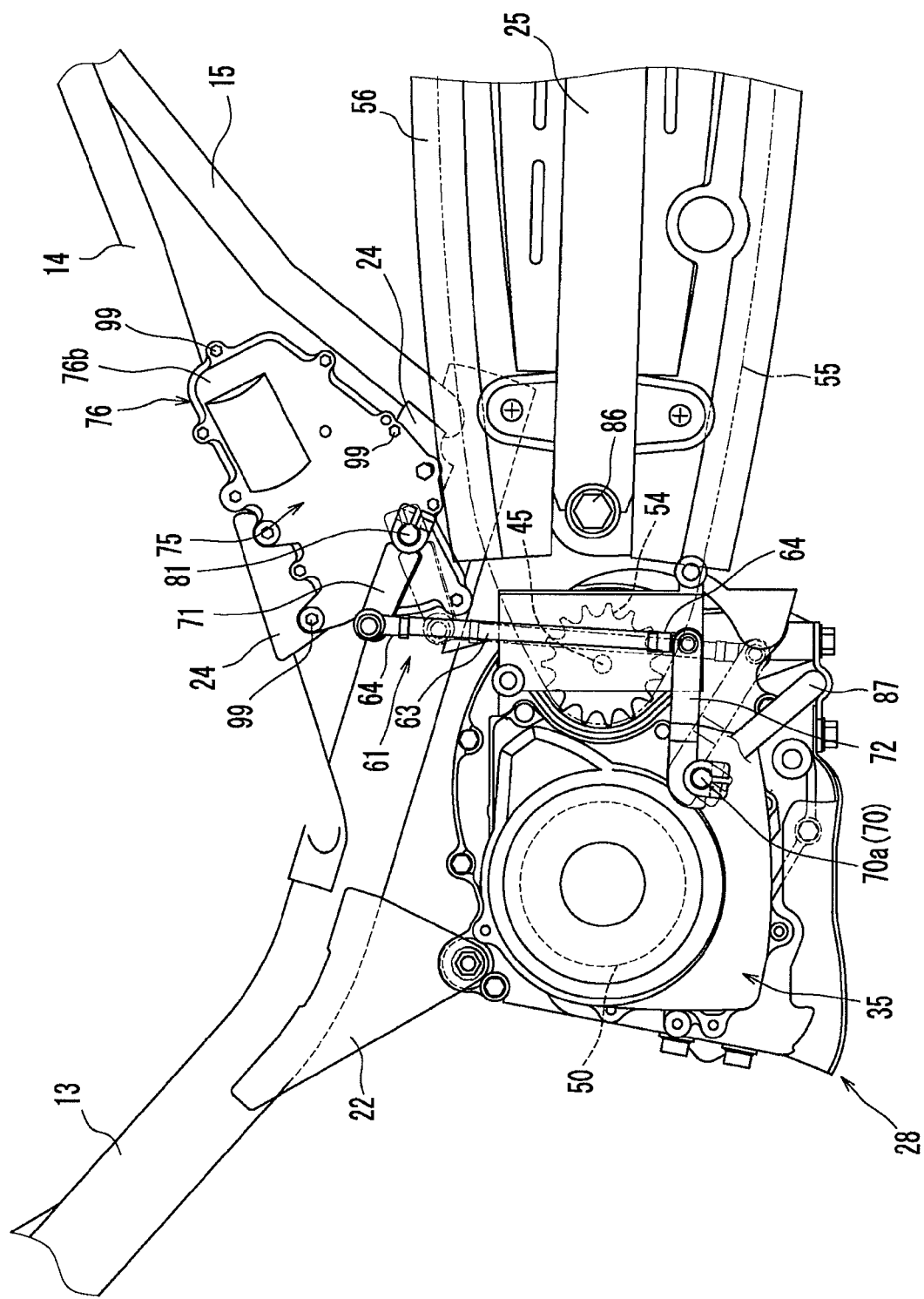
FIG. 6 is a partial left side elevation view of the motorcycle of FIG. 1.

As shown in FIG. 6, a chain cover 56 is disposed on a lateral side of the chain 55. The chain cover 56 preferably covers a top surface and a bottom surface of the chain 55. The illustrated chain cover also covers an outer surface of the chain 55 in the width direction of the vehicle. For clarity, the cylinder 43 (see FIG. 1) of the power unit 28 has been omitted in FIG. 6.

Figure 7:
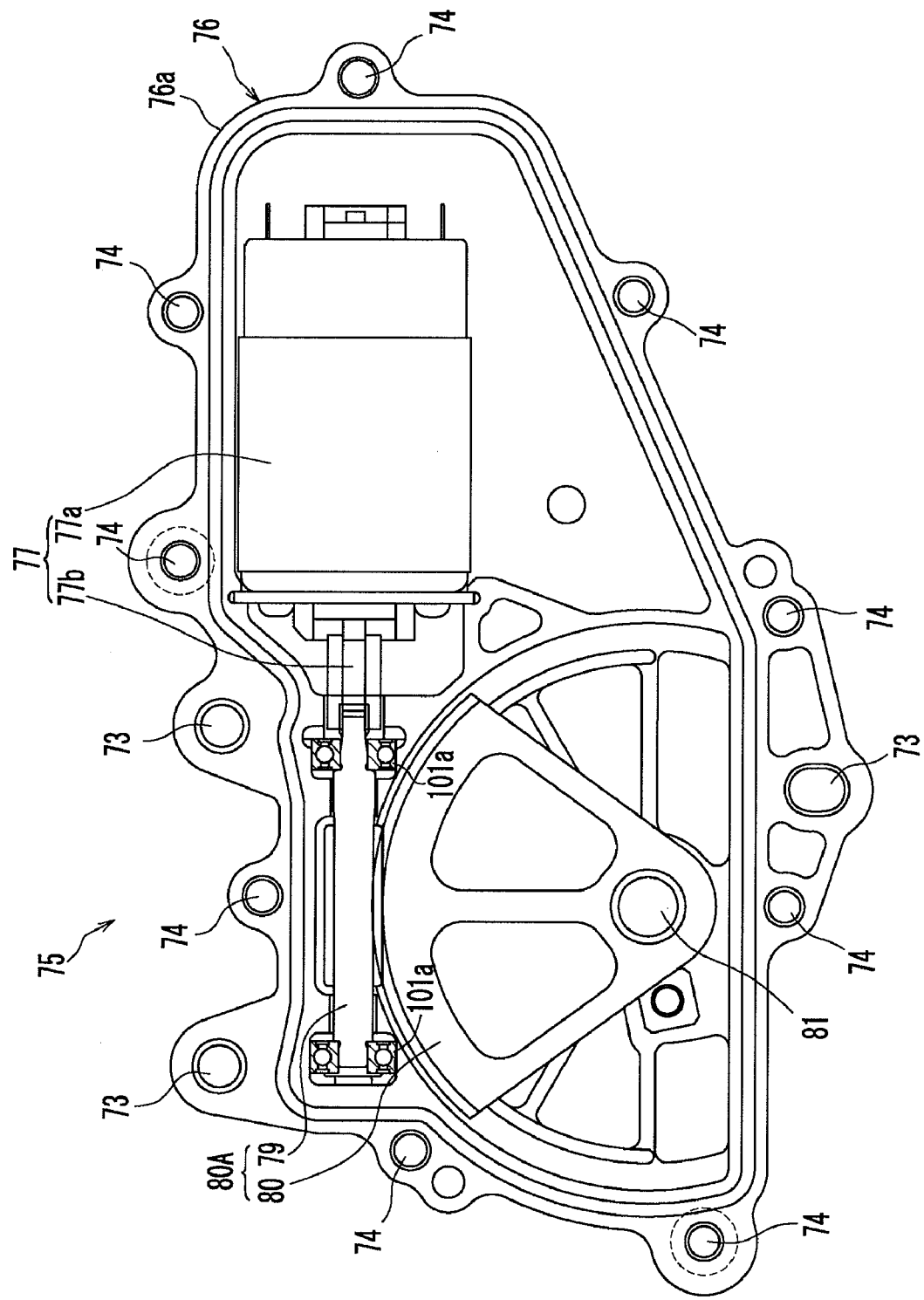
FIG. 7 is an inner structural view of an actuator.

As shown in FIG. 6, the actuator 75 is connected to the shift shaft 70 through a connecting unit 61. With reference to FIG. 7, an inner structural view of the actuator 75 is shown. The actuator 75 comprises a motor 77 formed with a motor body 77a and a motor shaft 77b, a worm gear 79 fixed to the motor shaft 77b, a worm wheel 80 meshed with the worm gear 79 and an output shaft 81 that is defined by a rotational shaft of the worm wheel 80. Bearings 101a support the worm gear 79 at its ends. The worm wheel 80 is formed to be a thin plate and also formed to be a fan-like shape viewed from an axial direction of the output shaft 81.

The worm gear 79 and the worm wheel 80 together form a worm gear unit 80A. Differing from a reduction gear unit formed with a plurality of spur gears assembled together, the worm gear unit 80A has a self locking function. That is, the worm gear unit 80A allows driving force to be directed from the motor 77 to the output shaft 81 but does not allow driving force to be directed from the output shaft 81 to the motor 77. Accordingly, the worm gear unit 80a is less likely to be cause the motor 77 to be driven by the output shaft 81.

The actuator 75 comprises a housing 76 that houses the motor 77, the worm gear 79 and the worm wheel 80. The housing 76 preferably is thin in an axial direction of the output shaft 81 and, thus, defines a thin housing. The housing 76 is split to define a first housing member 76a and a second housing member 76b that are separable from each other. In the illustrated configuration, the second housing member 76b that is positioned (i.e., toward the outside in the width direction of the vehicle) has an aperture through which the output shaft 81 extends. Thus, the output shaft 81 protrudes outside the housing 76 through the aperture.

A plurality of bolt holes 73, 74 (see FIG. 7) are formed at portions of respective peripheries of the first housing member 76a and the second housing member 76b. The first housing member 76a and the second housing member 76b are coupled with each other by bolts 99 (see FIG. 6) inserted into the bolt holes 73, 74. As shown in FIG. 6, brackets 24 are attached to the main frame 13 and the seat rails 14. The first housing member 76a and the second housing member 76b are mounted to the brackets 24 by the bolts 99 that are inserted into the bolt holes 74.

As shown in FIG. 6, the output shaft 81 of the actuator 75 and the protruding section 70a of the shift shaft 70 are connected to each other through the connecting unit 61. The connecting unit 61 comprises a rotational lever 71 coupled with the output shaft 81, a rotational arm 72 coupled with the protruding section 70a of the shift shaft 70, and a rod 63 connecting the rotational lever 71 and the rotational arm 72 to each other.

In the illustrated embodiment, a first connecting member connects the rod 63 and the rotational lever 71, and a second connecting member connects the rod 63 and the rotational arm 72. Through the illustrated coupling, the rod 63 can slant relative to the rotational lever 71 and/or the rotational arm 72 in the width direction of the vehicle. In the illustrated embodiment, ball joints 64 are used as such members but other suitable connection linkages can be used. In the illustrated configuration, one end of the rod 63 is coupled with the rotational lever 71 through one of the ball joints 64 while the other end of the rod 63 is coupled with the rotational arm 72 through the other ball joint 64.

Figure 8:
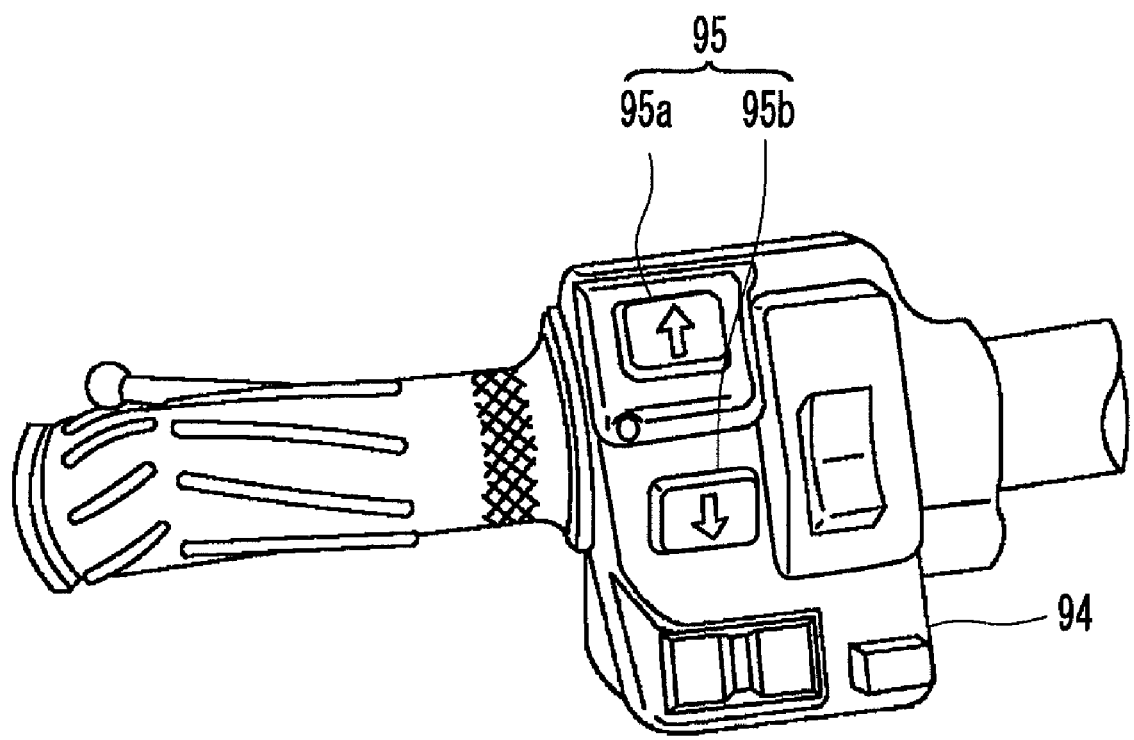
FIG. 8 is a perspective view of a switch box.

As shown in FIG. 8, a switch box 94 having a gearshift switch unit 95 preferably is disposed next to a grip of a handle bar on the left side. The gearshift switch unit 95 comprises, for example, an up-shift switch 95a and a down-shift switch 95b to allow a rider to move the shift position of the gear shifter up or down between a first shift stage and the maximum shift stage (for example, a sixth shift stage). When the up-shift switch 95a or the down-shift switch 95b is pushed, the actuator 75 rotates the shift shaft 70. With the rotation of the shift shaft 70, the gearshift clutch 37 is disengaged and combinations of some of the gears 46, 47 (combinations in which some of the gears 46, 47 mesh with each other) are changed. The gearshift operations thus are made.

Figure 9:
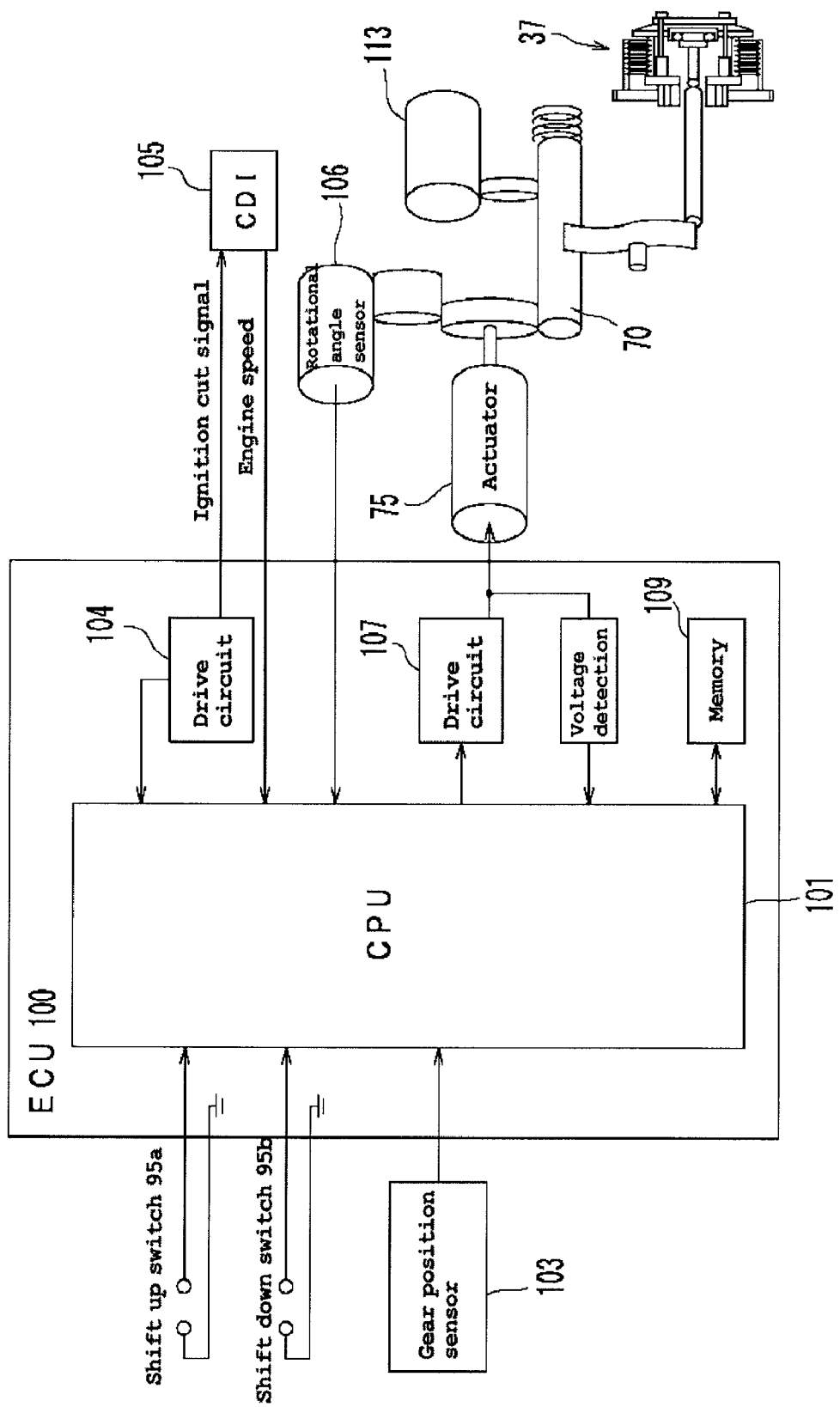
FIG. 9 is a block diagram schematically showing the overall structure of a control system incorporated in the motorcycle.
Figure 10:
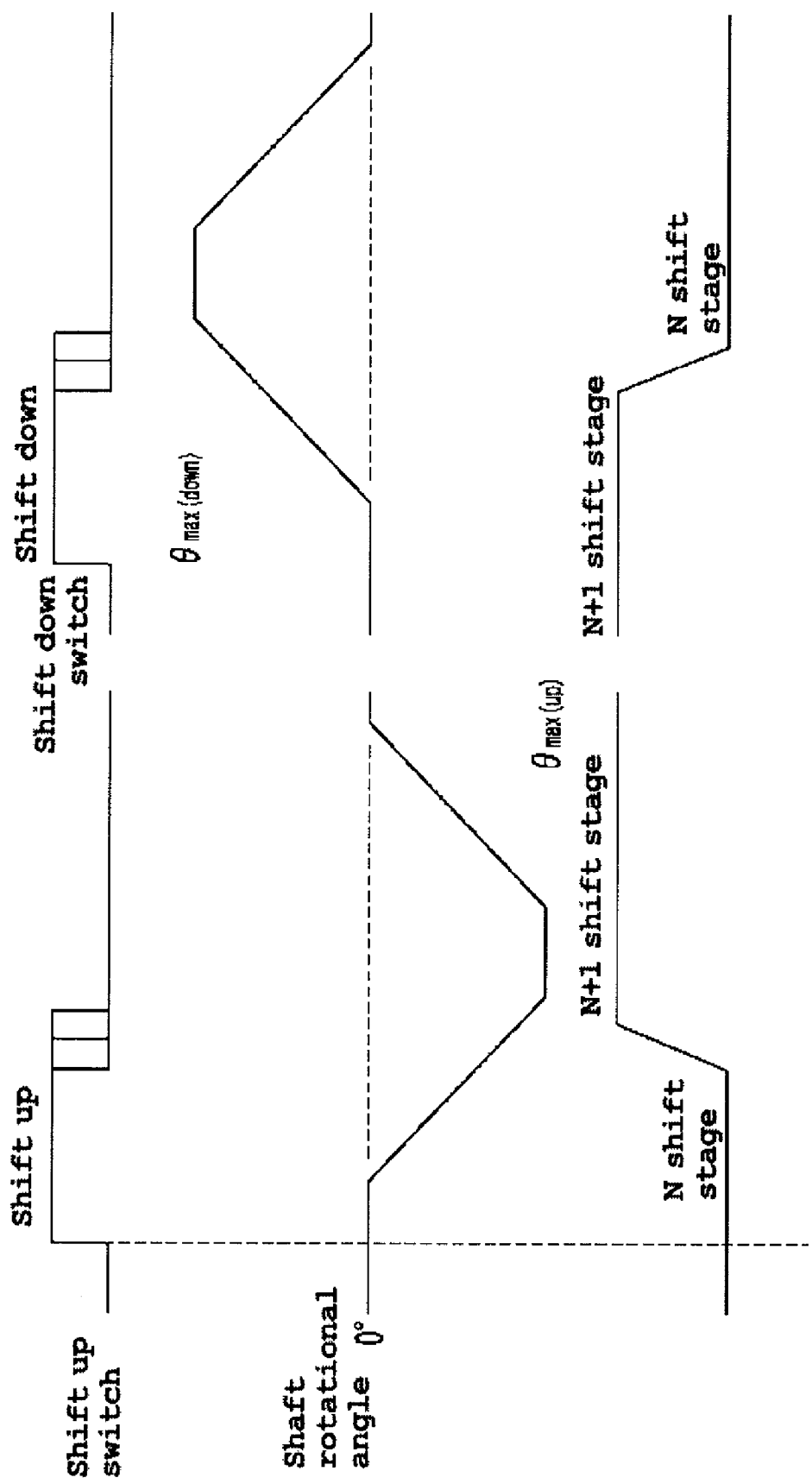
FIG. 10 is a chart diagramming gearshift operations for one embodiment.

FIG. 9 is a block diagram schematically showing the overall structure of a control system incorporated in the motorcycle 10. An engine control unit (ECU) 100 has a central processing unit (CPU) 101. The up-shift switch 95a and the down-shift switch 95b are connected to the CPU 101.

A gear position sensor 103 is connected to the CPU 101. The gear position sensor 103 preferably is a sensor that detects gear positions (e.g., by detecting rotational positions of the shift cam 113). The CPU 101 obtains the gear positions based upon the rotational positions of the shift cam 113 (see FIG. 4) detected by the gear position sensor 103.

A capacitive discharge ignition (CDI) unit 105 is connected to the CPU 101 through a drive circuit 104. The CDI unit 105 cuts some ignitions of the engine 29 based upon ignition cut signals supplied from the CPU 101 through the drive circuit 104 to reduce the driving power of the engine 29. Also, the CDI unit 105 detects rotational speeds of the engine 29 (engine speeds) and supplies the engine speed to the CPU 101. Thus, the CDI unit 105 can function as the engine speed detecting device.

The actuator 75 is connected to the CPU 101 through a drive circuit 107. The actuator 75 preferably comprises a motor, which is not shown. The drive circuit 107 controls operations (e.g., through pulse width modulation (PWM) control) of the motor of the actuator 75 based upon control signals sent from the CPU 101.

A rotational angle sensor 106 is connected to the CPU 101. The rotational angle sensor 106 detects rotational positions of the shift shaft 70. The rotational angle sensor 106 can directly detect the rotational positions of the shift shaft 70 or can indirectly detect them.

The ECU 100 has memory 109 including a ROM(s) and so forth.

Next, a gearshift operation of the motorcycle 10 will be described. FIG. 8 is an explanatory chart for explaining the gearshift operation. As shown in FIG. 8, when an up-shift operation is made (i.e., the up-shift switch 95a is operated), the shift shaft 70 makes a bidirectional rotational movement in which the shift shaft 70 rotates (reverse rotation) to reach a rotational position $\theta_{max(up)}$ and then returns to a reference angular position (0°). On the other hand, when a down-shift operation is made (the down-shift switch 95b is operated), the shift shaft 70 makes another bidirectional rotational movement in which the shift shaft 70 rotates (normal rotation) to reach a rotational position $\theta_{max(down)}$ and then returns to the reference angular position (0°).

The rotational position $\theta_{max(up)}$ preferably is a position where the gears of the gear shifter surely mesh with each other when the up-shift operation is made. Specifically, the rotational position $\theta_{max(up)}$ is a position of the shift shaft 70 when the shift shaft 70 rotates (reverse rotation) in the up shift direction and the gears of the gear shifter mesh with each other (gear meshing position under the reverse rotational condition), or a position at which the clutch is closer to the fully disengaged state than in the gear meshing position under the reverse rotational condition. In other words, during the rotation of the shift shaft 70, the gears change before the clutch reaches its fully disengaged state. Also, in one configuration, the rotational position $\theta_{max(up)}$ can be the maximum allowable rotation position of the shift shaft 70 in the reverse rotation (reverse rotation limit position), or it can be a position at which the clutch is closer to the fully engaged position than in the reverse rotation limit position.

The rotational position $\theta_{max(down)}$ is set to be a position where the gears of the gear shifter surely mesh with each other when the down-shift operation is made. Specifically, the rotational position $\theta_{max(down)}$ is a position of the shift shaft 70 when the shift shaft 70 rotates (normal rotation) in the down shift direction and the gears of the gear shifter mesh with each other (gear meshing position under the normal rotational condition), or a position at which the clutch is closer to the fully disengaged state than in the gear meshing position under the normal rotational condition. Also, in some configurations, the rotational position $\theta_{max(down)}$ is the maximum allowable rotation position of the shift shaft 70 in the normal rotation (normal rotation limit position), or a position at which the clutch is closer to the fully engaged position than in the normal rotation limit position.

The maximum rotation allowable positions (the reverse rotation limit position and the normal rotation limit position) preferably are the mechanically maximum rotational positions of the shift shaft 70. Respective magnitudes (absolute value) of the rotational position $\theta_{max(up)}$ and the rotational position $\theta_{max(down)}$ can be equal to each other or can be different from each other.

While the bidirectional rotational movement of the shift shaft 70 is made, the clutch 37 disengages, the gear shifter 38 shifts gears and the clutch 37 is reengaged, i.e., one series of the gearshift operation is executed.

With reference now to FIGS. 11-16, the gearshift operation will be described in detail. The gearshift control processes can be executed after being called by the main routine that is previously executed, when the rider makes a gearshift operation, i.e., the rider operates the up-shift switch 95a or the down-shift switch 95b.

In general, the gearshift control processes are processes for rotating the shift shaft 70 and, thereby, for causing the disengagement/engagement of the gearshift clutch 37 and for causes the gearshifts of the gear shifter 38. In the control processes, first, the disengagement operation of the gearshift clutch 37 (time t0-t2 of FIGS. 13 and 14) is executed and the shift shaft 70 is rotated at the maximum rotational speed. Then, the clutch position of the gearshift clutch 37 is held at a preset position (time t2-t3). Afterwards, the processes move to the engagement operation of the gearshift clutch 37 (time t3-t6). At this time, first, before the rotational position of the shift shaft 70 reaches a first position described later (at which the clutch is in a state closer to the filly disengaged state than in a halfway engaged range in which the clutch is in a halfway engaged state) (time t3-t4), the shift shaft 70 rotates at the maximum rotational speed. Next, before the rotational position of the shift shaft 70 reaches a second position described later (at which the clutch is in a state closer to the fully engaged state than in the halfway engaged range) from the first position (time t4-t5), the shift shaft 70 rotates at a low speed. When the rotational position of the shift shaft 70 reaches the second position, the shift shaft 70 rotates at the maximum rotational speed until the rotational position reaches the reference position (0°) (time t5-t6) so that the clutch 37 is fully engaged.

Figure 11:
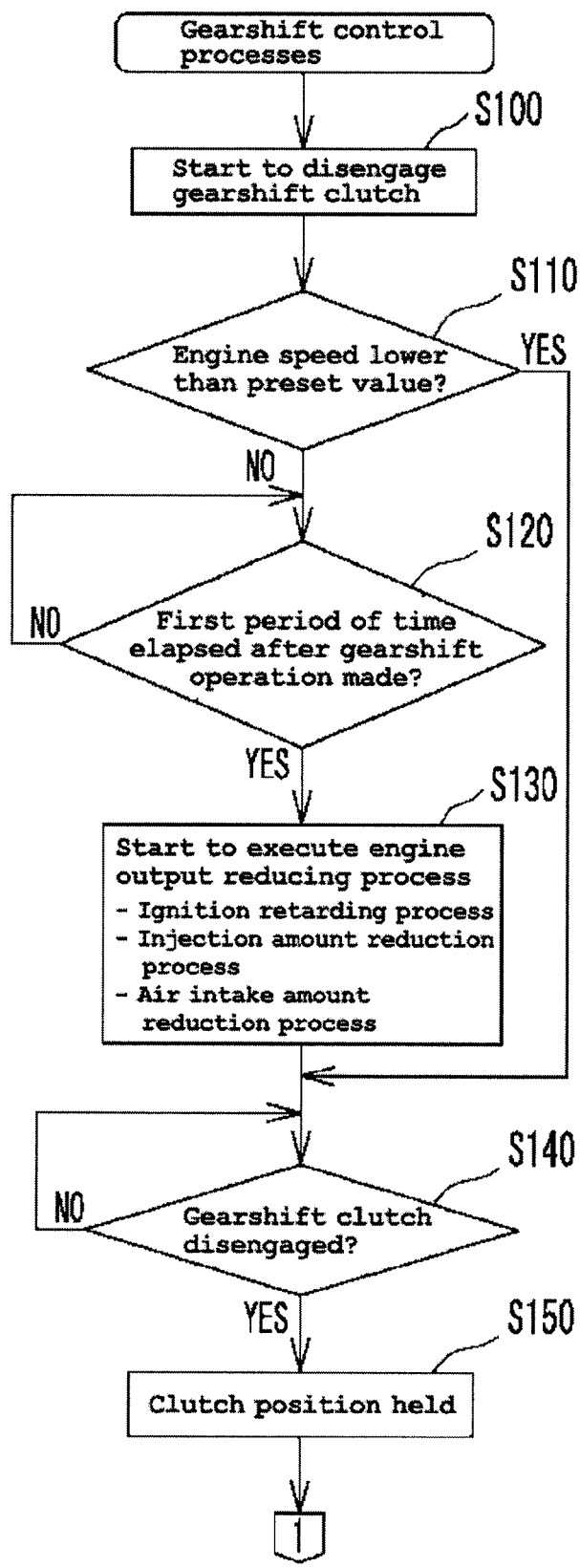
FIG. 11 is a flowchart showing a portion of a gearshift control process.
Figure 13:
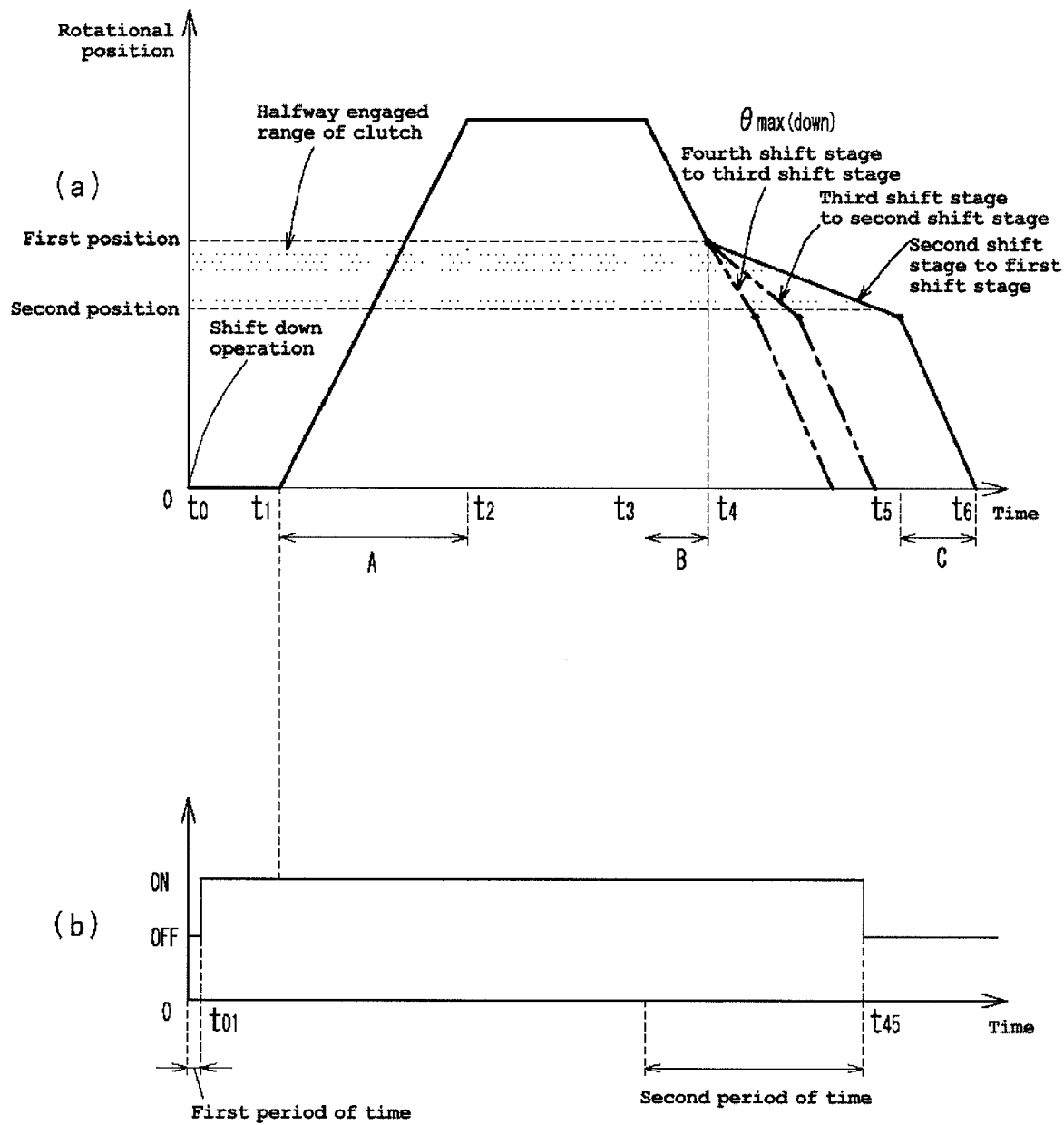
FIG. 13(a) is a graph showing rotational positions of a shift shaft when the gearshift control processes are executed.
FIG. 13(b) is a graph showing changes of an engine output reducing process over time.
Figure 14:
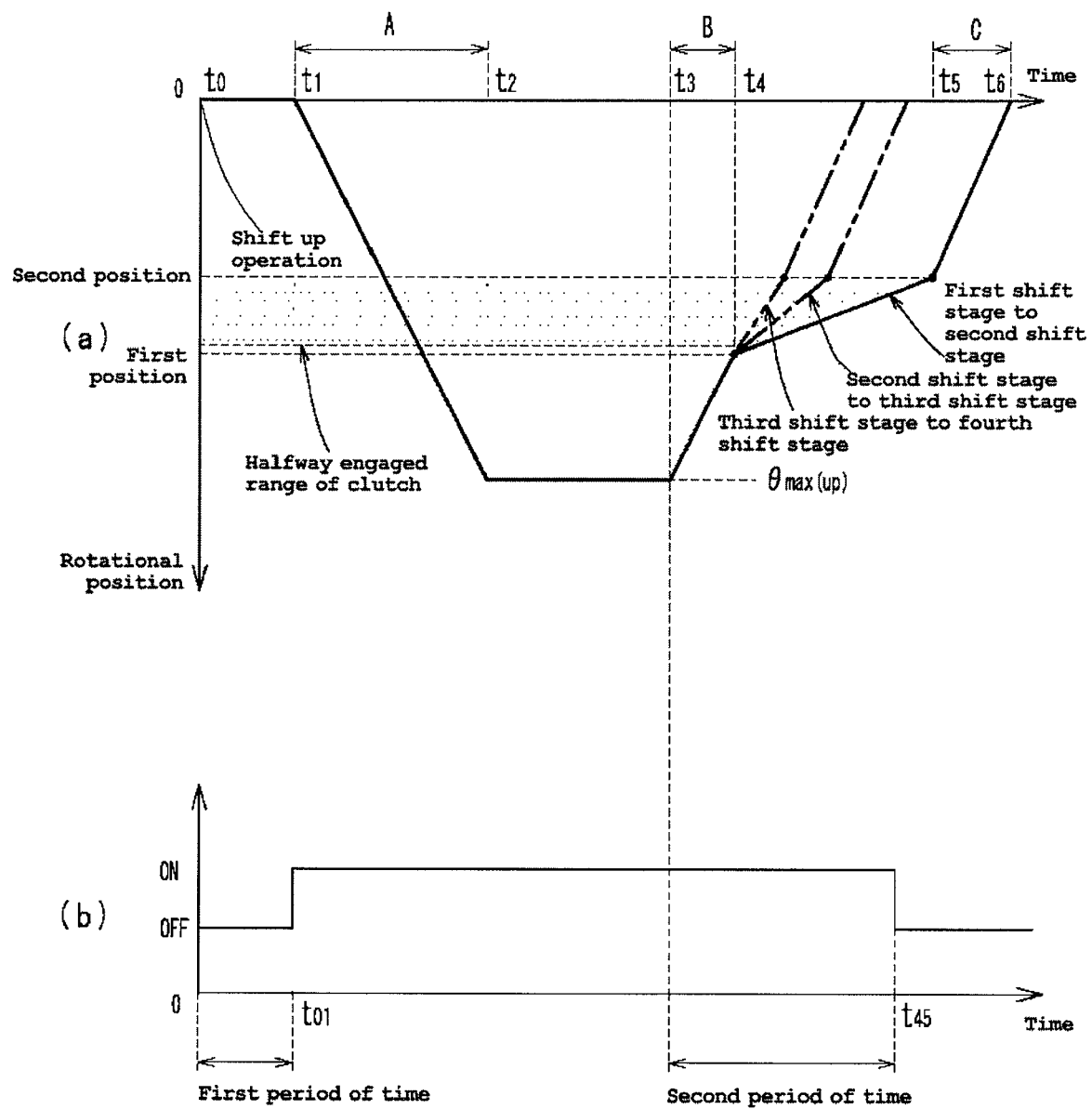
FIG. 14(a) is a graph showing rotational positions of the shift shaft under another condition when the gearshift control processes are executed.
FIG. 14(b) is a graph showing other changes of the engine output reducing process over time.

With reference to FIG. 11, when the ECU 100 executes the gearshift control processes, the ECU 100 starts the disengagement of the gearshift clutch 37 (see time t0 of FIGS. 13 and 14). See S100. In this process, the ECU 100 controls the operation of the actuator 75 so that the shift shaft 70 starts to rotate and the gearshift clutch 37 starts to be disengaged. There can be some delay before the shift shaft 70 starts to rotate after the rider requests the gearshift operation (inputs a command signal through the up-shift switch 95a or the down-shift switch 95b). Therefore, as shown in FIG. 13, the time t1 at which the shift shaft 70 starts to rotate is later than the time t0 at which the gearshift request is made. In addition, at step S100, the shift shaft 70 preferably rotates at the maximum rotational speed.

However, when the gearshift is made, the engine speed is preferably low because the gearshift clutch 37 is disengaged. In the illustrated embodiment, if the engine speed is too high, the ECU 100 executes an engine output reducing process. On the other hand, if the engine speed is sufficiently low, the driving force transmitted from the engine to the gearshift clutch 37 is small. The low engine speed thus generates a small shock when the gearshift clutch 37 is engaged.

If the engine output reducing operation described below is employed, engine braking is generated. If, however, the engine speed is low, engine braking is less likely to be desired. Therefore, in the illustrated embodiment, if the engine speed is equal to or lower than a predetermined engine speed, the engine output reducing process is not executed.

After executing the process of step S100, the ECU 100 determines, such as at step S110, whether an engine speed is lower than (or equal to) a preset value or not. Thus, the ECU 100 obtains an engine speed when that the gearshift request is made. The detected engine speed can be based upon a detection result of the CDI 105 that functions as the engine speed detecting device, and determines whether the obtained engine speed is lower than (or equal to) the preset value or not. If the ECU 100 determines that the engine speed is equal to or lower than the preset value, the shock can be small even though the gearshift clutch 37 is engaged under the condition that the engine output is not reduced. The ECU 100 thus goes to step S104 described below without executing the engine output reducing process.

On the other hand, if the ECU 100 determines, at step S110, that the engine speed is not equal to or lower than the preset value (i.e., exceeds the preset value), the ECU 100 executes the engine output reducing process. In the illustrated embodiment, the ECU 100 starts the engine output reducing process when a preset time elapses after the gearshift request to adjust a processing time for the engine output reducing process. However, it is practicable to start the engine output reducing process simultaneously when the gearshift request is made.

Specifically, the ECU 100 determines, at step 120, whether a preset time (first period) has elapsed or not after the gearshift operation is started through the operator request. The first period is a delay time before the engine output reducing process described later is started. If the ECU 100 determines that the first period of time has not yet elapsed, the ECU 100 continues to loop at the process of step S120.

In the illustrated embodiment, as shown in FIG. 13(b) and FIG. 14(b), different lengths of time are set as the first period between the up-shift operation and the down-shift operation. Specifically, the first period of time in the down-shift operation is generally "0," while the first period of time in the up-shift operation is longer than the first period of time in the down-shift operation (for example, 30 ms). Accordingly, a start time of the engine output reducing process, which will be described below, in the up-shift operation is later than that in the down-shift operation. However, the respective first period of time in the down-shift operation and the up-shift operation are not limited to any specific times.

On the other hand, at step S120, if the ECU 100 determines that the first period of time has elapsed after the gearshift operation is started, the ECU 100 starts the engine output reducing process at step S130 (see the time t01 of FIG. 13(b)). Although the engine output reducing process is not specifically restricted, the ECU 100 preferably executes at least one of the following three processes in the illustrated embodiment.

One technique for the engine output reducing process comprises an ignition retarding process. In the ignition retarding process, control signals, for example, are sent to an ignition plug control circuit (not shown) to change ignition times of ignition plugs (not shown) so that the changed ignition times are retarded relative to the normal ignition times.

Another technique for the engine output reducing process comprises reducing the amount of fuel injected. In the injection amount reduction process, control signals, for example, are sent to an injector control circuit (not shown) to reduce the amount of fuel injected from the fuel injectors (not shown).

A further technique comprises reducing the amount of air brought into the cylinder. In the air intake amount reduction process, control signals, for example, are sent to electronically controlled throttle valves (not shown) to adjust the openings of the throttle valves so that the air amount passing through the intake passages (not shown) of the engine 29 is reduced. Thereby, the air intake amount for the engine 29 is reduced.

As noted above, any other processes also can be used. Also, any of the processes used can be used alone or in combination.

If the ECU 100 executes step S130 or determines that the engine speed is equal to or lower than the preset value at step S140, the ECU 100 next determines, at step S140, whether the gearshift clutch 37 is disengaged or not. In this process, the ECU 100 determines whether the shift shaft 70 has reached the preset maximum rotational position. The position of the shift shaft 70 can serve as a proxy regarding whether the gearshift clutch 37 is in the disengaged state or not. If the ECU 100 determines that the gearshift clutch 37 is not yet disengaged, the ECU 100 returns to the process of step S140 and waits for the clutch 37 to disengage. As shown in FIG. 13(a), the maximum rotational position in the down-shift operation is the position $\theta_{max(down)}$. On the other hand, as shown in FIG. 14(a), the maximum rotational position in the up-shift operation is the position $\theta_{max(up)}$ that is directed in the opposite direction to the position in the down-shift operation.

When the processes of steps S100 and S140 are executed, the shift shaft 70, as shown in FIG. 13(a) and FIG. 14(a), rotates at the maximum rotational speed until the rotational positions reach the maximum rotational positions ($\theta_{max(up)}$, $\theta_{max(down)}$) (time t2). The gearshift clutch 37 is thereby disengaged.

If the ECU 100 determines, at step S140, that the gearshift clutch 37 is disengaged, the ECU 100 next executes a process, at step S150, to hold the clutch position. The clutch of the gearshift clutch 37 is thereby held in the disengaged state.

Figure 12:
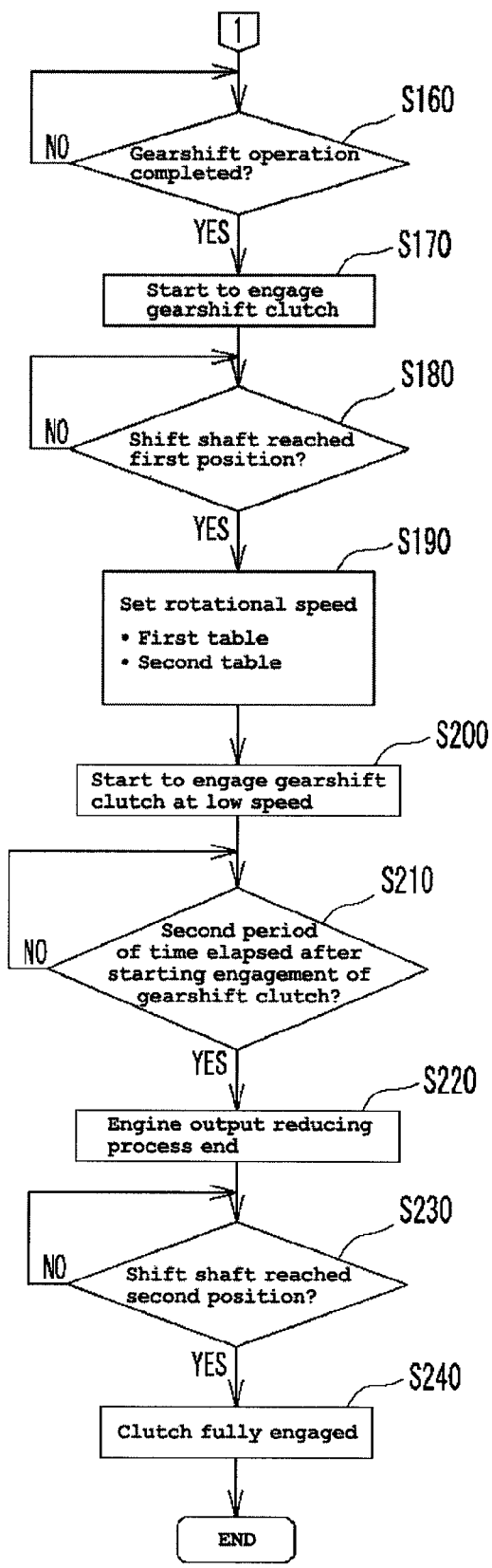
FIG. 12 is another flowchart showing a portion of the gearshift control process.

As shown in FIG. 12, after executing the process of step S150, the ECU 100 next determines, at step S160, whether the gearshift has completed or not. In this process, the ECU 100 determines whether the gearshift of the gear shifter 38 has been completed or not based upon a detection result of the gear position sensor 103. If the ECU 100 determines that the gearshift has not been completed yet, the ECU 100 returns to the process of step S160 and waits for the completion of the gearshift.

On the other hand, if the ECU 100 determines, at step S160, that the gearshift has been completed, the ECU 100 next executes a process for starting the engagement of the gearshift clutch 37 at step S170 (time t3 of FIG. 13 and FIG. 14). In this process, the ECU 100 controls the operation of the actuator 75 so that the shift shaft 70 rotates and the gearshift clutch 37 starts to be engaged. Additionally, the rotational speed of the shift shaft 70 at step S170 is the maximum rotational speed, similar to the situation at step S100. Also, at step S170, the shift shaft 70 rotates in the opposite direction relative to the rotation of the shift shaft 70 in the process of step S100. Additionally, the maximum rotational speed in the disengagement direction and the maximum rotational speed in the engagement direction can be consistent with each other or can be different from each other.

After executing the process of step S170, the ECU 100 next determines, at step S180, whether the shift shaft has reached the preset first position or not. In this process, the ECU 100 determines whether the rotational position of the shift shaft 70 has reached the preset first position or not based upon a detection result of the rotational angle sensor 106. As shown in FIG. 13(a) and FIG. 14(a), the first position is a rotational position of the shift shaft 70 at which the clutch is in a state closer to the fully disengaged state than in a halfway engaged range in which the clutch is in a halfway engaged state. If the ECU 100 determines that the shift shaft 70 has not yet reached the first position, the ECU 100 returns to the process of step S180 and waits until the rotational position of the shift shaft 70 reaches the first position.

Because the processes of steps S170 and S180 are executed as described above, the shift shaft 70 rotates at the maximum rotational speed until the rotational position reaches the first position (time t4 of FIG. 13 and FIG. 14).

If, at step S180, the ECU 100 determines that the rotational position of the shift shaft 70 has reached the first position, the ECU 100 next executes, at step S190, a process for setting a rotational speed of the shift shaft 70. In this process, the ECU 100 sets the rotational speed of the shift shaft 70 continuing from the first position to the second position described later. The rotational speed of the shift shaft 70 from the first position to the second position is lower than the rotational speed from the disengagement position to the first position.

The rotational speed preferably is flexibly set in accordance with the respective shift stages of the shift gears or operational conditions of the engine 29 to reduce shocks of the gearshift operations and further enhance the ride comfort of an operator. Therefore, in this embodiment, the rotational speed is decided based upon the respective shift stages of the shift gears and the engine speeds. Specifically, in this embodiment, the rotational speed is set to be the sum of a first speed decided based upon a first table shown in FIG. 15 and a second speed decided based upon a second table having the characteristics shown in FIGS. 16(a) and (b).

Thus, the first speed is set every shift stage of the shift gears. That is, the rotational speed of the shift shaft 70 in its low speed rotation is set in accordance with the shift stages of the shift gears. Damping force generated in the vehicle body of the motorcycle 10 when the gearshifts are made varies corresponding to the shift stages of the shift gears. Therefore, the setting of the first speed in accordance with the shift stages enables the rotational speed to be set in accordance with the damping force.

FIG. 15 shows a table as one example of the first table referenced in the process of step S190. As described above, the first speed is set in accordance with the shift stages (up-shift or down-shift) of the shift gears. For example, in an up-shift operation from a first shift stage to a second shift stage, the first speed is set to be a speed $\Delta\theta_{12}$. Also, for example, in a down-shift operation from a fourth shift stage to a third shift stage, the first speed is set to be a speed $\Delta\theta_{43}$. The first speed in the up-shift operation becomes larger in the order of $\Delta\theta_{12}$, $\Delta\theta_{23}$, $\Delta\theta_{34}$. That is, the lower the shift stage in the up-shift operation, the lower the rotational speed of the shift shaft 70, and the gearshift clutch 37 is engaged at the lower speed. Also, the first speed in the down-shift operation becomes larger in the order of $\Delta\theta_{21}$, $\Delta\theta_{32}$, $\Delta\theta_{43}$. In the down-shift operation, similar to the up-shift operation, the lower the shift stage in the down-shift operation, the lower the rotational speed of the shift shaft 70 (see also FIG. 13(a) and FIG. 14(a)).

As discussed above, in one embodiment, the second speed is applied as a factor for setting the rotational speed of the shift shaft 70 in its low speed rotation from the first position to the second position. In this connection, the second speed is set in accordance with the engine speed. That is, the rotational speed in the low speed rotation is set in accordance with the engine speed given when the gearshift operation is made.

Therefore, an engagement speed of the gearshift clutch 37 can be set in accordance with magnitudes of the engine power transmitted to the gearshift clutch 37.

FIG. 16 shows graphs representing one example of characteristics of the second table referenced in the process of step S190. FIG. 16(a) shows the second table referenced in the up-shift operation. FIG. 16(b) shows the second table referenced in the down-shift operation. As shown in FIG. 16, the second speed is set based upon engine speeds and either one of the up-shift operation or the down-shift operation. In this embodiment, the engine speed is the engine speed given when the gearshift operation is made (i.e., when the up-shift switch 95a or the down-shift switch 95b is operated) and also is the engine speed given when the gearshift control processes shown in FIG. 11 are started (see time t0 of FIG. 13 and FIG. 14).

As shown in FIG. 16(a), in the up-shift operation, if the engine speed exists between a speed N1 and a speed N2, the second speed that is set increases with the increase of the engine speed. If the engine speed exceeds the speed N2, the second speed is fixed to a speed $\Delta\theta_a$. On the other hand, in the up-shift operation, if the engine speed exists between "0" and a speed N3, the second speed that is set is fixed to a speed $\Delta\theta_b$. If the engine speed exists between the speed N3 and a speed N4, the second speed that is set decreases with the decrease of the engine speed. If the engine speed exceeds the speed N4, the second speed is "0."

As discussed above, the rotational speed of the shift shaft 70 from the first position to the second position is set to be the sum of the first speed set based upon the first table shown in FIG. 15 and the second speed set based upon the second table shown in FIG. 16. For example, if it is the up-shift operation from the first shift stage to the second shift stage and the engine speed given when the gearshift operation is made is the speed N2, the rotational speed of the shift shaft 70 is a speed $\Delta\theta_{12}+\Delta\theta_a$. Also, for example, if it is the down-shift operation from the fourth shift stage to the third shift stage and the engine speed given when the gearshift operation is made is the speed N4, the rotational speed of the shift shaft 70 is a speed $\Delta\theta_{43}+$"0"$=\Delta\theta_{43}$.

After executing the process of step S190, the ECU 100 next starts, at step S200, to control the shift clutch to be engaged at a low speed (see time t4 of FIG. 13 and FIG. 14). In this process, the ECU 100 operates the actuator 75 based upon the rotational speed of the shift shaft 70 set in the process of step S190. When the ECU 100 executes this process, the shift shaft 70 rotates at a low speed that is the rotational speed set in the process of step S190. The gearshift clutch 37 thus is engaged at the lower speed. That is, the rotational speed of the shift shaft 70 given when this process is executed is slower than the rotational speed of the shift shaft 70 given when the process of step S170 is executed.

FIG. 13 and FIG. 14 show an example in which the engine speeds in the gearshift operations made in the respective shift stages are the same as each other. That is, FIG. 13 and FIG. 14 show such an example in which the second speeds decided in accordance with the engine speeds in connection with the respective shift stages are the same as one another. As shown in FIG. 13 and FIG. 14, in both of the up-shift operation and the down-shift operation, the higher the shift stage toward which the gearshift is made, the higher the rotational speed of the shift shaft 70. Because large speed reduction force is generated in the gearshift operation to the lower shift stage, it is possible to lower the rotational speed and also to engage the gearshift clutch 37 at the lower speed, as described above.

After executing the process of step S200, the ECU 100, next, determines, at step S210, whether a second period of time has elapsed or not from the start of the shift clutch engagement operation. The second period of time is, similar to the first period of time, a waiting time for adjusting the process time of the engine output reducing process. When this second period of time elapses, the ECU 100 ends the engine output reducing process. Specifically, the ECU 100 determines whether the preset time (second period of time) has elapsed or not after starting of the engagement of the gearshift clutch 37 in the process of step S170. If the ECU 100 determines that the second period of time has not elapsed yet, the ECU 100 returns to the process of step S210 and waits for the second period of time to elapse.

In the illustrated embodiment, the same time is set to be the second period of time in the down-shift operation regardless of which shift stage the down-shift operation is made toward. On the other hand, in the up-shift operation, the second period of time is set dependent upon the shift stage toward which the up-shift operation is made. Specifically, the lower the shift stage toward which the up-shift operation is made, the longer the second period of time. Accordingly, in the up-shift operation, the lower the shift stage toward which the up-shift operation is made, the longer the executing time for the engine output reducing process.

On the other hand, if the ECU 100 determines, at step S210, that the second period of time has elapsed, the ECU 100 ends the engine output reducing process at step S220 (see time t45 of FIG. 13(b) and FIG. 14(b)). Additionally, if the ECU 100 determines that the engine speed is equal to or lower than the preset value in the process of step S110 (see FIG. 11), the ECU 100 does not start the engine output reducing process at step S130. Thus, the ECU 100 does not execute the process of step S220.

After executing the process of step S220, the ECU 100 next determines, at step S230, whether the shift shaft 70 has reached the second position or not. In this process, the ECU 100 determines whether the rotational position of the shift shaft 70 has reached the preset second position or not based upon a detection result of the rotational angle sensor 106. As shown in FIG. 13(a) and FIG. 14(a), the second position is the rotational position of the shift shaft 70 at which the clutch is in a state closer to the fully engaged state to a certain extent than in the halfway engaged range. If the ECU 100 determines that the shift shaft 70 has not yet reached the second position, the ECU 100 returns to the process of step S230 and waits until the rotational position of the shift shaft 70 reaches the second position.

On the other hand, if the ECU 100 determines, at step S230, that the rotational position of the shift shaft 70 has reached the second position (see time t5 of FIG. 13 and FIG. 14), the ECU 100 executes a process for fully engaging the gearshift clutch 37 at step S240. In this process, the ECU 100 controls the actuator 75 to rotate the shift shaft 70 until the rotational position reaches the reference position (0°) from the second position. The rotational speed of the shift shaft 70 on this occasion is the maximum rotational speed. After executing the process of step S240, the ECU 100 ends the gearshift control processes (time t6 of FIG. 13 and FIG. 14).

As thus described, in this embodiment, the ECU 100 controls the actuator 75 based on the rotational position and the speed of the shift shaft 70 in the engagement operation of the gearshift clutch 37 when the gearshift is made. Specifically, the memory 109 of the ECU 100 stores the first position at which the clutch is in the state closer to the fully disengaged state than in the halfway engaged range in which the clutch is in the halfway engaged state and the second position at which the clutch is in the state closer to the fully engaged state than in the halfway engaged range. In other words, the first position and the second position are set in such a manner that the range of the rotational position between the first position and the second position includes the halfway engaged range. In the engagement operation of the gearshift clutch 37, while detecting the position of the shift shaft 70 using the rotational angle sensor 106, the ECU 100 rotates the shift shaft 70 at the maximum rotational speed until reaching the first position, and rotates the shift shaft 70 at the speed slower than the maximum rotational speed until reaching the second position from the first position. Thereby, the shock generated at the clutch engagement moment more likely to be reduced.

Additionally, various transmitting members (members for transmitting the driving force of the actuator 75 to the gearshift clutch 37) such as, for example, the clutch operating power transmitting mechanism 270, the first push rod 527 and the second push rod 529 are interposed between the actuator 75 and the gearshift clutch 37. The rotation of the actuator 75 is converted to disengage/engage of the gearshift clutch 37 through those transmitting members. Therefore, an individual difference can appear in the halfway engaged range because of tolerance stackups and other dimensional deviations introduced from the manufacture of the transmitting members or from the assembling work or the like. The first position and the second position thus are set in consideration of the individual differences in the halfway engaged range. That is, in the illustrated embodiment, the first position and the second position are determined in such a manner that the rotational position range between the first position and the second position includes the halfway engaged range can take into account deviations among all of the motorcycles manufactured. Therefore, even though individual motorcycles may vary from one to the next, the shock generated at the clutch engagement moment can be reduced.

Also, in this embodiment, the worm gear unit 80A having the self-lock function is positioned between the motor 77 of the actuator 75 and the shift shaft 70. Thus, the driving force directed from the motor 77 toward the shift shaft 70 is transmitted. However, no driving force in the opposite direction is transmitted. Accordingly, in the gearshift operations, the ECU 100 can control the motor 77 without receiving any reaction force from the spring of the clutch operating power transmitting mechanism 270 (i.e., the compression coil spring 293), the spring of the gearshift clutch 37 (i.e., the compression spring 60) or the like. Thus, the reaction forces are less likely to adversely impact the control and the control of the motor 77 can be stabilized. That is, the ECU 100 can stably execute the control based upon the position and the speed of the shift shaft 70.

Figure 17:
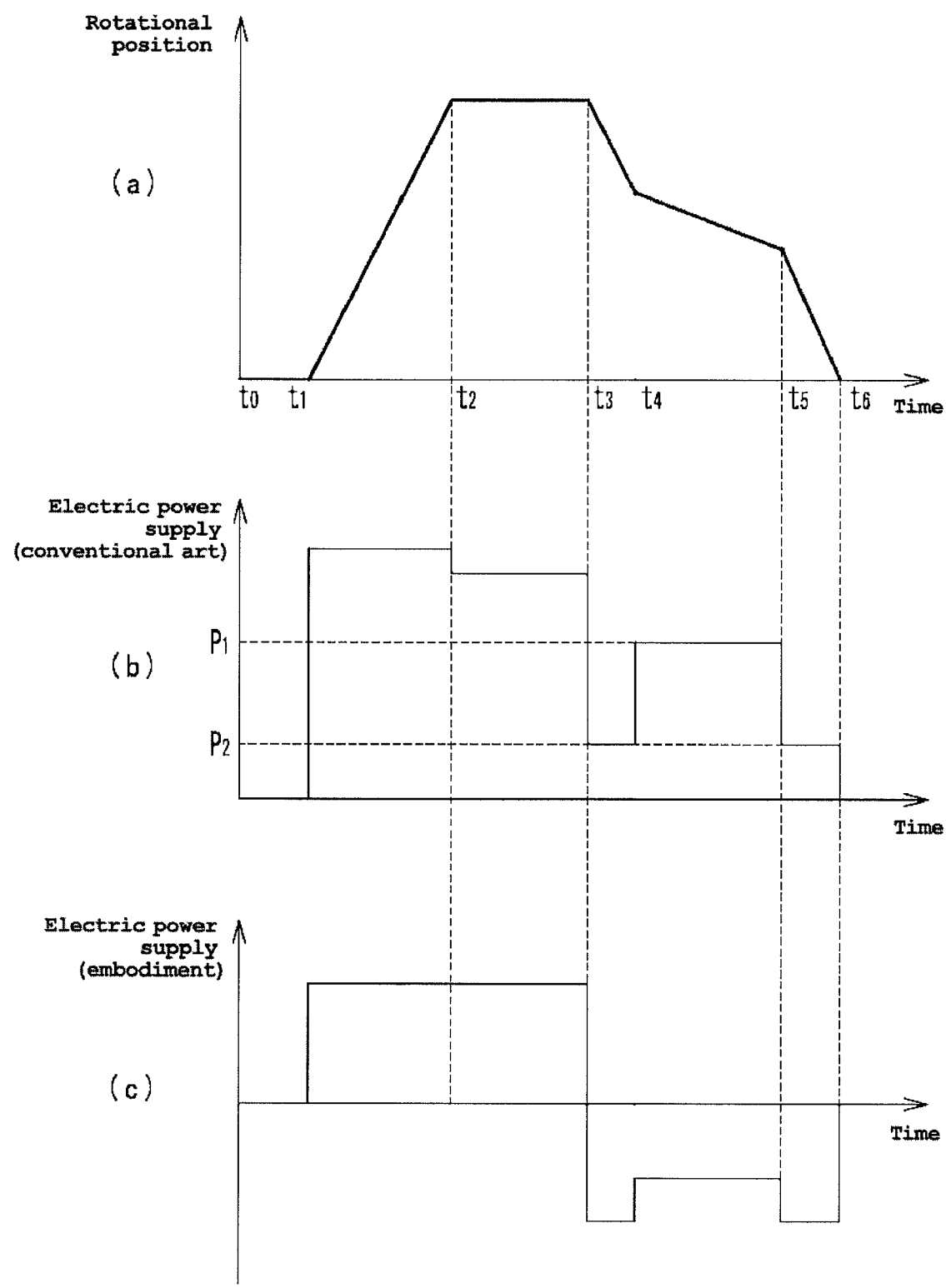
FIG. 17(a) is a graph showing changes of the rotational position of the shift shaft over time.
FIG. 17(b) is a graph showing changes of electric power supply over time in a prior configuration.
FIG. 17(c) is a graph showing changes of electric power supply over time in the illustrated embodiment.
Figure 18:
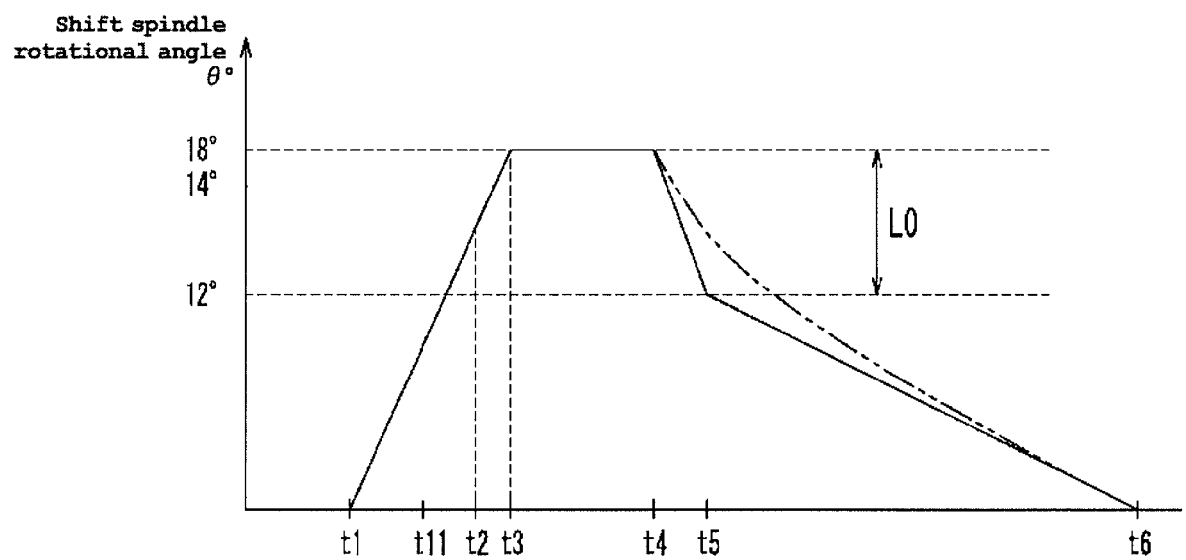
FIG. 18 is a graph showing changes of the rotational position of the shift shaft over time in a prior configuration.

FIG. 17(*a*) is a graph showing the rotational positions of the shift shaft given when the gearshift operation is made. FIGS. 17(*b*) and 17(*c*) are graphs showing changes of an electric power supply amount to the motor of the actuator. FIG. 17(*b*) shows such changes in the conventional art (i.e., the conventional art disclosed in JP-A-Hei 11-82709 and U.S. Pat. No. 6,085,607B), while FIG. 17(*c*) shows such changes in a configuration such as disclosed in the above-described embodiment.

Because the motor always receives reaction force such as, for example, the reaction force of the springs of the clutch operating power transmitting mechanism and the clutch in the conventional art, a certain amount of electric power is necessary, as shown in FIG. 17(*b*), to rotate the shift shaft in the clutch engagement direction (see the power supply P1 at a period of time t3-t4, the power supply P2 at a period of time t4-t5 and the supply P1 at a period of time t4-t5). That is, it is necessary to continuously provide power corresponding to the reaction force of the springs or the like to the shift shaft.

However, the electric power amount necessitated in the situation depends on a magnitude of the reaction force of the springs or the like. The reaction force of the springs or the like depends on the individual difference of the motorcycle and can change due to the longtime use thereof. Therefore, although the predetermined amount of the electric power is supplied as shown in FIG. 17(*b*), accurate change of the rotational position of the shift shaft as indicated in FIG. 17(*b*) can be sometimes difficult.

To the contrary, in the illustrated embodiment, the motor 77 does not receive any reaction force such as, for example, the reaction force of the spring of the clutch operating power transmitting mechanism 270. The motor 77 thus is not required to generate any driving force corresponding to such reaction force discussed above when the motor 77 rotates the clutch shaft 70 in the clutch engagement direction. Therefore, as shown in FIG. 17(*c*), no extra electric power is necessary to be provided in consideration of the reaction force of the springs or the like. The control of the motor 77 thus can be stabilized.

In the meantime, the speed reduction force generated in the motorcycle 10 when the gearshift is made is different depending on the shift stage toward which the gearshift is made. However, in the motorcycle 10 according to the above-described embodiment, the rotational speed of the shift shaft 70 in the low speed rotation is set in accordance with the shift stage toward which the gearshift is made. That is, as the factor for setting the rotational speed in the low speed rotation of the shift shaft 70, the first speed described above is applied. The first speed is set in accordance with the shift stage toward which the gearshift is made. Thus, according to this embodiment, the speed corresponding to the shift stage toward which the gearshift is made is set, and the rotational speed corresponding to the speed reduction force to the vehicle body is set. As a result, the shock generated in the clutch engagement moment can be more effectively reduced.

The phrase "a (the) rotational speed of a (the) shift shaft is set in accordance with a (the) gearshift stage" means that the gearshift stage is one factor for setting the rotational speed of the shift shaft. Accordingly, the phrase covers not only the situation in which the rotational speed is set simply in accordance with the gearshift stage but also the situation in which the rotational speed is set in accordance with the gearshift stage and one or more other factors (in this embodiment, the engine speed).

Also, according to the motorcycle 10 of this embodiment, as one of the other factors for setting the rotational speed of the shift shaft 70 in the low speed rotation (a factor other than the first speed described above), the second speed is applied. The second speed is set in response to the engine speed given when the up-shift switch 95*a* or the down-shift switch 95*b* is operated. That is, the rotational speed of the shift shaft 70 in the low speed rotation is set in response to the engine speed given when the gearshift is made. Therefore, the engagement speed of the shift clutch 37 can be set in response to the magnitude of the engine power transmitted to the shift clutch 37.

The phrase "a (the) rotational speed of a (the) shift shaft is set in response to an (the) engine speed given when a (the) gearshift switch is operated" means that the engine speed given at a moment that the gearshift switch is operated or given in a preset time range around the moment is one factor for setting the rotational speed of the shift shaft. Accordingly, the phrase covers not only the situation in which the rotational speed is set simply in response to the engine speed but also the situation in which the rotational speed is set in response to the engine speed and one or more other factors (in this embodiment, the gearshift stage). In addition, the phrase covers not only the situation in which the engine speed given at the moment that the gearshift switch (the up-shift switch 95a or the down-shift switch 95b) is operated functions as the factor but also the situation in which the engine speed given in the preset time range around the moment functions as the factor.

Also, in the illustrated motorcycle 10, the engine output reducing process (at least one of processes among the ignition retarding process, the injection amount reduction process and the air intake amount reduction process) is started when the first period of time elapses after the gearshift operation is requested, and the engine output reducing process is ended when the second period of time elapses after the clutch engagement operation is started. Because the engine output is reduced while the gearshift is operated as described above, the engine power transmitted to the shift clutch 37 can be reduced. As a result, the shock generated in the clutch engagement moment can be further reduced.

Meanwhile, in the embodiment described above, the rotational speed of the shift shaft 70 from the first position to the second position is set in response to the engine speed given when the gearshift switch (the up-shift switch 95a or the down-shift switch 95b) is operated. However, the time at which the rotational speed of the shift shaft 70 is decided is not limited to the operation time of the gearshift switch.

For example, the rotational speed of the shift shaft 70 from the first position to the second position can be set in response to the engine speed given when the shift shaft 70 starts to rotate in the engagement direction of the shift clutch 37 (see the time t3 of FIG. 13(a) and FIG. 14(a)). In this alternative, a period of time between the moment that the rotational speed of the shift shaft 70 is set and the moment that the shift shaft 70 starts to rotate from the first position toward the second position is short. Accordingly, the time delay ranging from the moment that the rotational speed of the shift shat 70 is set and to the moment that the shift shaft 70 actually starts to rotate is small. The shift shaft 70 thus can rotate at a more proper speed corresponding to the engine speed.

If the engine speed is low, the shock generated in the engagement moment of the shift clutch 37 is not necessarily reduced. That is, if the engine speed is low, the rotational speed of the shift shaft 70 is not necessarily lowered even though the shift shaft 70 is on the way to the second position from the first position. Therefore, if the engine speed exceeds a preset value during the period of time between the moment that the gearshift switch is operated and the moment that the shift shaft 70 starts to rotate in the engagement direction of the shift clutch 37, the shift shaft 70 can be rotated at a speed lower than the maximum rotational speed from the first position to the second position. Also, if the engine speed does not reach the preset value, the shift shaft 70 can be rotated at the maximum rotational speed as it stands. Thereby, if the shock generated in the engagement moment of the shift clutch 37 is small, the shift clutch 37 can be rapidly engaged. The gearshift can be smoothly operated, accordingly.

In the embodiment described above, the first position and the second position are previously stored in the memory 109 of the ECU 100 and are fixed values. However, in the present invention, an alternative in which the first position and the second position both are changeable is applicable.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A shift control device comprising:
   a drive power source adapted to generate a rotary drive force;
   a shift shaft coupled to the drive power source such that the drive power source can rotate the shift shaft;
   a clutch operating power transmitting mechanism that is joined to a clutch and to the shift shaft such that the clutch operating power transmitting mechanism can be used to disengage and engage the clutch with the rotation of the shift shaft;
   a shifter operating power transmitting mechanism that is connected to a transmission shifting component and to the shift shaft such that the shifter operating power transmitting mechanism can operate the transmission shifting component with the rotation of the shift shaft;
   a control unit for controlling the drive power source;
   a position sensor for detecting rotational positions of the shift shaft; and
   a storage unit for storing a first position that is one of the rotational positions and that is a position in which the clutch is in a state closer to a fully disengaged state than a halfway engaged range in which the clutch is in a halfway engaged state, and a second position that is another one of the rotational positions and that is a position at which the clutch is in a state closer to a fully engaged state than the halfway engaged range, wherein
   the control unit controls the drive power source to rotate the shift shaft to the first position at a preset speed when the clutch is engaged after the clutch has been once disengaged and a shift movement of the transmission shifting component has been made, and the control unit controls the drive power source to rotate the shift shaft from the first position to the second position at a speed slower than the preset speed.

2. The shift control device according to claim 1 further comprising a power transmitting mechanism positioned between the drive power source and the shift shaft, the power transmitting mechanism transmitting driving force from the drive power source toward the shift shaft and not transmitting driving force from the shift shaft toward the drive power source.

3. The shift control device according to claim 1 further comprising a worm gear positioned between the drive power source and the shift shaft for transmitting driving force from the drive power source to the shift shaft.

4. A straddle vehicle including the shift control device according to claim 1.

5. The straddle vehicle according to claim 4, wherein
   the transmission shifting component is a gear type shifter having a plurality of shiftable gears,
   a rotational speed of the shift shaft in rotation from the first position to the second position is set in accordance with a gearshift stage of the shifter.

6. The straddle vehicle according to claim 4 further comprising
   an engine;
   an engine speed detecting device adapted to detect an engine speed of the engine; and
   a gearshift switch through which a gearshift request of a rider is input, wherein a rotational speed of the shift shaft in the rotation from the first position to the second position is set in response to the engine speed detected when the gearshift switch is operated.

7. The straddle vehicle according to claim 4 further comprising:
an engine;
an engine speed detecting device adapted to detect an engine speed of the engine, wherein
a rotational speed of the shift shaft in rotation from the first position to the second position is set in response to the engine speed detected when the shift shaft starts to rotate in a direction that engages the clutch.

8. The straddle vehicle according to claim 4 further comprising:
an engine;
an engine speed detecting device adapted to detect an engine speed of the engine; and
a gearshift switch through which a gearshift request by a rider is input, wherein
the shift shaft is rotated from the first position to the second position at a speed slower than the preset speed if the engine speed becomes equal to or higher than a preset engine speed during a period of time from a moment that the gearshift switch is operated to a moment that the shift shaft starts to rotate in a direction for engaging the clutch, and the shift shaft is rotated from the first position to the second position at the preset speed if the engine speed does not reach the preset engine speed during the period of time.

9. The straddle vehicle of claim 4 further comprising:
an engine; and
an engine control device that is adapted to control an output of the engine, wherein the engine control device executes an engine output reducing process to reduce the output of the engine when a disengaging and engaging operation of the clutch is made during an up-shift or a down-shift operation.

10. A method for controlling gearshift using a shift control device comprising:
rotating a shift shaft from an angular position corresponding to a fully disengaged clutch state to a first angular position at a first angular speed;
rotating the shift shaft from the first angular position to a second angular position at a second angular speed; and
rotating the shift shaft from the second angular position to a third angular position at a third angular speed, the third angular position corresponding to a fully engaged clutch state,
wherein the second angular speed is slower than the first angular speed or the third angular speed.

11. The method of claim 10, wherein the second angular speed of the shift shaft is determined based upon respective shift stages of shift gears and engine speed.

12. The method of claim 11, wherein the second angular speed is faster for higher shift stages than for lower shift stages.

13. The method of claim 11, wherein the second angular speed is set using information stored in a memory, wherein the information comprises the shift stages and the engine speed.

14. The method of claim 11, wherein at the first angular position the clutch is in a state closer to the fully disengaged state than in a halfway engaged range in which the clutch is in a halfway engaged state, and wherein at the second angular position the clutch is in a state closer to the fully engaged state than in the halfway engaged range.

15. The method of claim 11, further comprising, prior to the step of rotating the shift shaft from the angular position corresponding to the fully disengaged clutch state to the first angular position at the first angular speed, the steps of:
determining whether a speed of an engine is lower than a preset value;
if the speed is not lower than the preset value reducing engine output, performing a step of disengaging the clutch;
determining whether the shift shaft reaches a preset maximum rotational position and the clutch is disengaged;
if the clutch is not disengaged, performing a step of waiting for the clutch to be disengaged;
holding the clutch in the disengagement state for a predetermined period of time;
determining whether the gearshift operation is completed; and
if the gearshift operation is not completed, then performing a step of waiting for the gearshift operation to be completed.

* * * * *